US011988742B2

(12) United States Patent
Habib et al.

(10) Patent No.: US 11,988,742 B2
(45) Date of Patent: May 21, 2024

(54) DETECT AND AVOID SYSTEM AND METHOD FOR AERIAL VEHICLES

(71) Applicant: MightyFly Inc., Richmond, CA (US)

(72) Inventors: Manal Habib, Richmond, CA (US); Scott Parker, Richmond, CA (US)

(73) Assignee: MightyFly Inc., San Leandro, CA (US)

( * ) Notice: Subject to any disclaimer, the term of this patent is extended or adjusted under 35 U.S.C. 154(b) by 323 days.

(21) Appl. No.: 17/475,476

(22) Filed: Sep. 15, 2021

(65) Prior Publication Data

US 2022/0003863 A1 Jan. 6, 2022

Related U.S. Application Data

(63) Continuation-in-part of application No. 17/218,032, filed on Mar. 30, 2021.

(Continued)

(51) Int. Cl.
*G01S 13/00* (2006.01)
*B64C 29/00* (2006.01)
(Continued)

(52) U.S. Cl.
CPC ........ *G01S 13/933* (2020.01); *B64C 29/0025* (2013.01); *B64D 9/00* (2013.01);
(Continued)

(58) Field of Classification Search
CPC . G01S 13/933; G01S 13/953; B64C 29/0025; B64C 1/1415; B64D 9/00;
(Continued)

(56) References Cited

U.S. PATENT DOCUMENTS 3,563,496 A * 2/1971 Zuck ..................... B64C 27/026
416/123
4,312,619 A * 1/1982 Anderson .............. B65G 69/24
414/351

(Continued)

FOREIGN PATENT DOCUMENTS

| AU | 2019208250 A1 | 4/2020 | |
| WO | WO-2018078387 A1 * | 5/2018 | ............. B64C 1/069 |
| WO | WO-2021046558 A1 * | 3/2021 | ................ B60P 3/40 |

OTHER PUBLICATIONS

PCT/US21/50369; Notification of Transmittal of The International Search Report and The Written Opinion of the International Searching Authority, or the Declaration (PCT Rule 44.1); Authorized Officer: Kari Rodriquez.

*Primary Examiner* — Peter D Nolan
*Assistant Examiner* — Peter Y Ning

(57) ABSTRACT

Embodiments of the invention(s) cover a method and system in which the system monitors outputs of a set of subsystems associated with a flying vehicle, wherein the flying vehicle comprises a set of fixed-wing operation modes and a set of vertical take-off and landing (VTOL) operation modes, and wherein the set of subsystems generate signals associated with an operational environment surrounding the flying vehicle; from said outputs of the set of subsystems, generating a risk assessment characterizing one or more potential hazards associated with the environment surrounding the flying vehicle; based upon the risk assessment, returning instructions for execution of a detect and avoid operation; and optionally, executing the detect and avoid operation.

21 Claims, 13 Drawing Sheets

Related U.S. Application Data

(60) Provisional application No. 63/079,001, filed on Sep. 16, 2020, provisional application No. 63/006,173, filed on Apr. 7, 2020.

(51) Int. Cl.
  *B64D 9/00* (2006.01)
  *G01S 13/933* (2020.01)
  *G08G 5/00* (2006.01)
  *G08G 5/02* (2006.01)
  *G08G 5/04* (2006.01)

(52) U.S. Cl.
  CPC ......... *G08G 5/0021* (2013.01); *G08G 5/0052* (2013.01); *G08G 5/0065* (2013.01); *G08G 5/0091* (2013.01); *G08G 5/025* (2013.01); *G08G 5/045* (2013.01)

(58) Field of Classification Search
  CPC .. G08G 5/0021; G08G 5/0052; G08G 5/0065; G08G 5/0091; G08G 5/025; G08G 5/045; G08G 5/0008; G08G 5/0013; G08G 5/006; G08G 5/0069; G08G 5/0078; B64U 2101/60; B64U 2201/10; Y02A 90/10; G01M 1/125; G06V 20/58; G01W 1/08
  See application file for complete search history.

(56) References Cited

U.S. PATENT DOCUMENTS

| | | | |
|---|---|---|---|
| 7,059,566 B2 | 6/2006 | Byers et al. | |
| 8,876,057 B2 | 11/2014 | Alber et al. | |
| 8,960,592 B1 | 2/2015 | Windisch | |
| 9,096,314 B2 | 8/2015 | Brotherton-Ratcliffe et al. | |
| 9,205,930 B2 * | 12/2015 | Yanagawa | G01M 1/125 |
| 9,580,173 B1 | 2/2017 | Burgess et al. | |
| 9,754,496 B2 | 9/2017 | Chan et al. | |
| 9,754,497 B1 | 9/2017 | Smith et al. | |
| 9,773,418 B1 | 9/2017 | Smith et al. | |
| 9,873,508 B2 * | 1/2018 | Apkarian | B64U 30/297 |
| 10,220,963 B2 | 3/2019 | Peverill et al. | |
| 10,239,611 B2 | 3/2019 | Apkarian | |
| D852,092 S | 6/2019 | Woodworth et al. | |
| 10,372,143 B2 | 8/2019 | MacCready et al. | |
| 10,399,666 B2 | 9/2019 | Beckman et al. | |
| 10,723,442 B2 | 7/2020 | Greiner et al. | |
| 10,759,537 B2 * | 9/2020 | Moore | B64C 29/0016 |
| 10,814,974 B2 | 10/2020 | Randall | |
| 10,839,336 B2 | 11/2020 | Greiner et al. | |
| 11,535,368 B2 * | 12/2022 | Tian | B64U 10/20 |
| 2006/0038077 A1 * | 2/2006 | Olin | G06Q 10/08 244/137.1 |
| 2007/0025832 A1 * | 2/2007 | Rawdon | B64D 9/00 414/401 |
| 2011/0084162 A1 * | 4/2011 | Goossen | B64D 1/22 244/135 C |
| 2017/0300051 A1 | 10/2017 | Zhou et al. | |
| 2017/0361928 A1 | 12/2017 | Matsuda | |
| 2018/0114450 A1 * | 4/2018 | Glaab | G08G 5/025 |
| 2018/0253981 A1 | 9/2018 | Raptopoulos et al. | |
| 2019/0019423 A1 * | 1/2019 | Choi | G05D 1/0088 |
| 2019/0071171 A1 | 3/2019 | Dormiani et al. | |
| 2019/0127056 A1 * | 5/2019 | Weekes | B64U 30/10 |
| 2019/0193839 A1 | 6/2019 | Voss | |
| 2019/0233107 A1 * | 8/2019 | Tian | B64C 39/08 |
| 2019/0291626 A1 * | 9/2019 | Duffy | B64C 37/00 |
| 2019/0291860 A1 | 9/2019 | Morgan | |
| 2019/0322368 A1 | 10/2019 | Melcher | |
| 2020/0010194 A1 | 1/2020 | Liu et al. | |
| 2020/0090530 A1 | 3/2020 | Zhang et al. | |
| 2020/0118450 A1 | 4/2020 | Gariel et al. | |
| 2020/0140079 A1 * | 5/2020 | Campbell | B64C 29/0033 |
| 2020/0172236 A1 * | 6/2020 | George | B64D 9/00 |
| 2020/0231302 A1 * | 7/2020 | Turner | B64D 1/12 |
| 2020/0242949 A1 | 7/2020 | Eyhorn | |
| 2020/0250993 A1 | 8/2020 | Li et al. | |
| 2020/0265726 A1 | 8/2020 | LeBlanc | |
| 2020/0365042 A1 | 11/2020 | Mahalingam et al. | |
| 2021/0107620 A1 * | 4/2021 | Weekes | B64C 1/30 |
| 2021/0264798 A1 * | 8/2021 | B | G08G 5/0086 |
| 2021/0309353 A1 * | 10/2021 | Gil | B64D 1/10 |
| 2021/0309354 A1 * | 10/2021 | Parker | G01G 19/07 |
| 2022/0003863 A1 * | 1/2022 | Habib | B64C 1/1415 |
| 2022/0177109 A1 * | 6/2022 | Hefner | B64C 39/08 |
| 2022/0289383 A1 * | 9/2022 | Poe | B64C 1/20 |
| 2022/0348330 A1 * | 11/2022 | Karni | B64D 13/00 |
| 2023/0264838 A1 * | 8/2023 | Myoor Kandhadai | B64U 60/10 244/7 A |

* cited by examiner

TOP VIEW

DETECT AND AVOID SYSTEM AND METHOD FOR AERIAL VEHICLES

CROSS-REFERENCE TO RELATED APPLICATIONS

This application claims the benefit of U.S. Provisional Application No. 63/079,001 filed on 16 Sep. 2020, which is incorporated in its entirety herein by this reference.

This application is also a continuation-in-part of U.S. application Ser. No. 17/218,032 filed 30 Mar. 2021, which claims the benefit of U.S. Provisional Application No. 63/006,173 filed on 7 Apr. 2020, which are each incorporated in its entirety herein by this reference.

TECHNICAL FIELD

This invention relates generally to the field of aerial vehicles, and more specifically to a new and useful system and method for providing reliable detection and avoidance capabilities in the field of aerial vehicles.

BACKGROUND

Current detect and avoid systems for aerial vehicles (and other vehicles and systems) are unable to detect and avoid obstacles under all types of weather conditions, given that most sensors have limited capabilities. For example, vision systems fail under poor weather (e.g., instrument flight rules) conditions and acoustic systems fail when there is an above-threshold amount of environmental noise. Detect and avoid systems are further typically based upon pre-loaded maps, requiring large on board memory, maintenance, and regular database updates to accommodate different flight paths. Additionally, radar systems of current detect and avoid systems contribute a significant amount of weight to aerial vehicles, along with other deficiencies, motivating improved systems.

In the context of autonomous delivery platforms, aerial delivery shipments can be subject to delays under certain weather and/or traffic circumstances, which can significantly reduce revenue or otherwise decrease throughput. These issues additionally extend beyond the context of aerial delivery operations, and apply to passenger transport as well.

Thus, there is a need in the field of aerial vehicles to create new and useful detect and avoid systems.

DESCRIPTION OF THE PREFERRED EMBODIMENTS

Figure 1A:
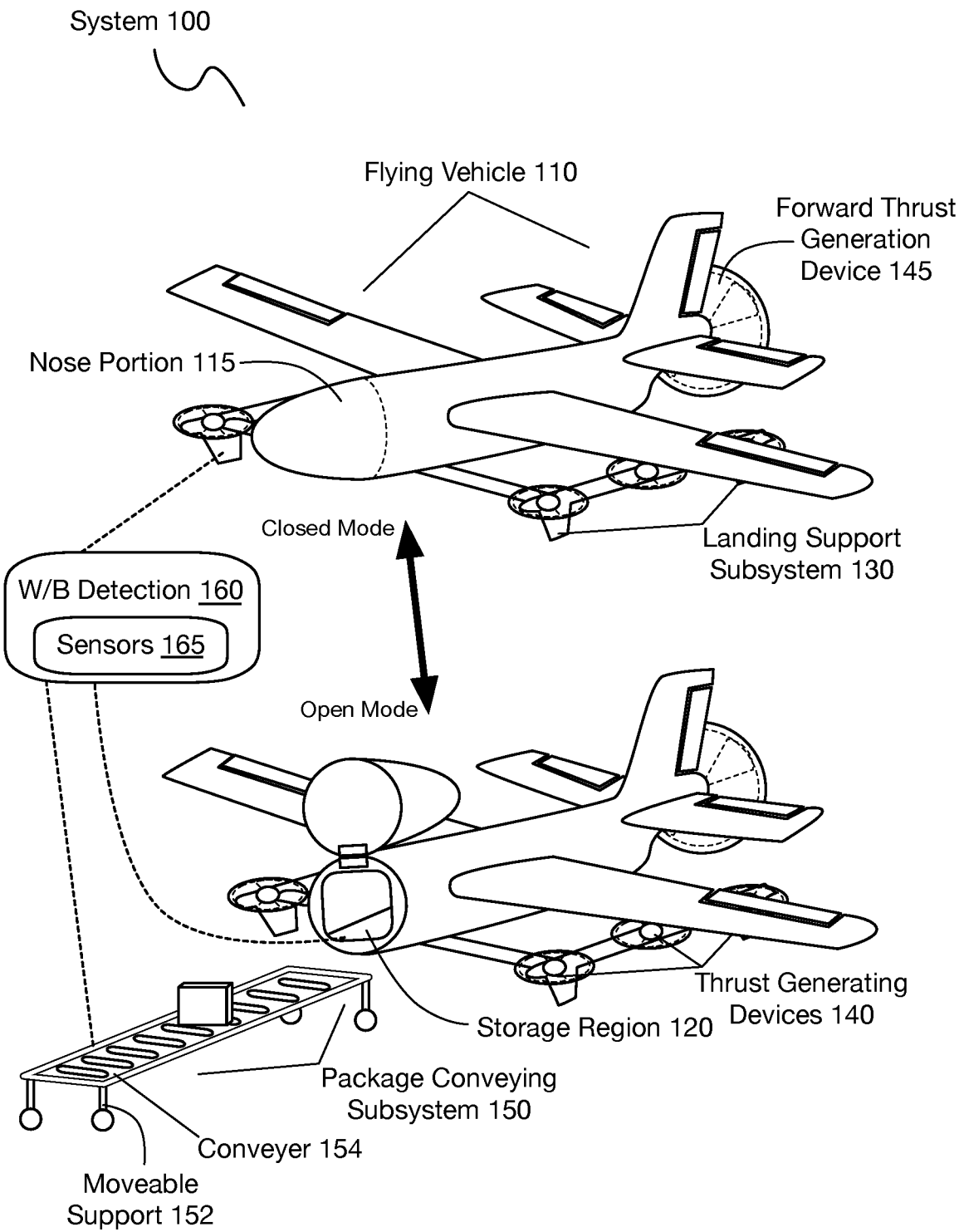
FIG. 1A depicts an embodiment of a system for package transportation.

The following description of the preferred embodiments of the invention is not intended to limit the invention to these preferred embodiments, but rather to enable any person skilled in the art to make and use this invention.

1. Benefits

The inventions associated with the system and method can confer several benefits over conventional systems and methods, and such inventions are further implemented into many practical applications related to improvements in package delivery.

The invention(s) provide reliable systems and methods for detection and avoidance of obstacles and objects, under a wide range of environmental conditions and other conditions. In particular, the invention(s) include architecture and structures having functionality for detecting traffic (e.g., cooperative traffic, non-cooperative traffic) and detecting and avoiding potential air traffic collision under visual flight rules (VFR) conditions and instrument flight rules (IFR) conditions.

In embodiments, the invention(s) include a set of sensors coupled to and/or configured about an aerial vehicle, to generate signals that are processed to generate instructions for detect and avoid functionality.

In embodiments, the invention(s) include architecture for transitioning between operation modes in flight and on the ground, including implementation of vertical takeoff and landing (VTOL) and electric VTOL (eVTOL) operation modes, and transitioning between such modes and fixed-wing operation modes. Such operation modes include various avoidance maneuvers, takeoff maneuvers, and landing maneuvers, in various types of air space (e.g., airborne collision avoidance system (ACAS) maneuvers, etc.).

In embodiments, the invention(s) further include architecture implementing logic for decision-making and landing in various traffic and environmental conditions.

The invention(s) employ novel aerial vehicle design features that promote efficiency in package handling and interactions with human and/or non-human entities, during delivery, flight, and ground operations.

The invention(s) also employ non-traditional systems and methods for package delivery. In particular, the invention(s) implement novel and non-obvious package loading, storing, and unloading systems that can handle multiple packages, with weight and balance management subsystems for ensuring proper loading and/or maintaining weight and balance characteristics (e.g., center of gravity) within suitable ranges during various modes of aerial vehicle operation.

The invention(s) also employ aerodynamic surfaces configured to improve flight performance (e.g., in relation to range extension, endurance, speed, fuel efficiency, etc.).

The invention(s) also employ safety features configured to separate moving aerial vehicle parts from human and/or non-human entities during delivery, flight, and ground operations.

The invention(s) also employ forward thrust elements for increasing longitudinal speed and range of the aerial vehicle and for serving other suitable functions.

The invention(s) can also be used to provide automated transmission of delivery-associated notifications, in collaboration with entities associated with a chain of delivery operation phases.

Additionally or alternatively, the system and/or method can confer any other suitable benefit.

2. Aerial Vehicle Platform and Systems

As shown in FIG. 1A, an embodiment of a system 100 for package delivery includes: an aerial vehicle 110 including a nose portion 115 having an open mode and a closed mode; a storage region 120 within the aerial vehicle 110; a landing support subsystem 130 coupled to the aerial vehicle 110; a set of thrust generating devices 140 including a forward thrust generation device 145, the set of thrust generating devices 140 coupled to the aerial vehicle 110; a package conveying subsystem 150 configured to interface with the nose portion 115 of the aerial vehicle 110; and a weight and balance detection subsystem 160 comprising a set of sensors 165 coupled to at least one of the aerial vehicle 110 and the package conveying subsystem 150. In variations, one or more portions of the system 100, including aerial vehicle components (e.g., fuselage, wings, fuel system, tail, nose, etc.) can be configured to be modular or non-modular in design.

Figure 2:
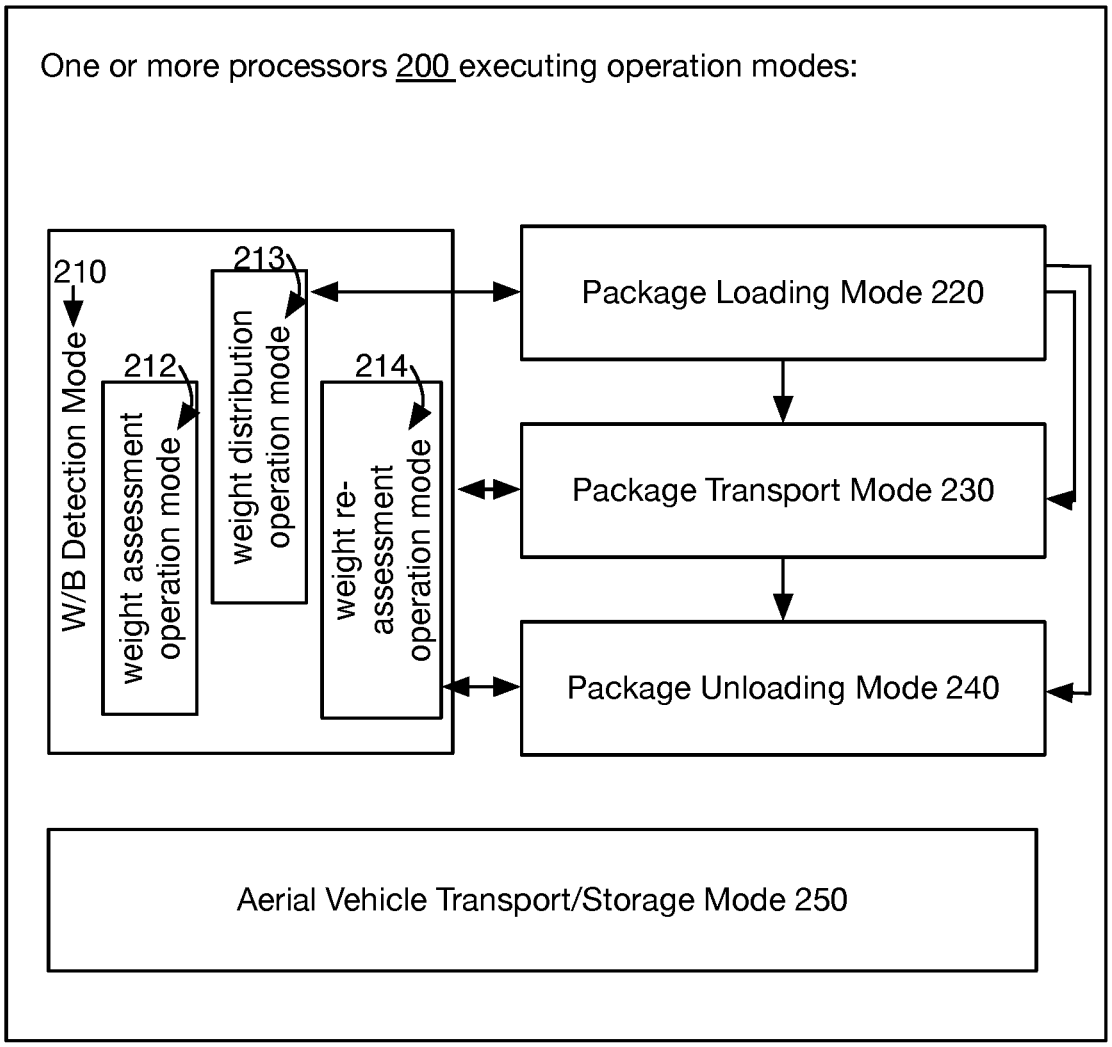
FIG. 2 depicts an embodiment of various operation modes of a system for package transportation.

As shown in FIG. 2, embodiments of the system 100 can be configured to execute a set of operation modes including one or more of: a weight and balance detection mode 210, a package loading mode 220, a package transport mode 230, and a package unloading mode 240, and/or a diagnostics/pre-flighting mode configured to assess statuses of one or more aerial vehicle subsystems, where various aspects of the system configurations in each mode are further described in Section 2.5 below.

Figure 3:
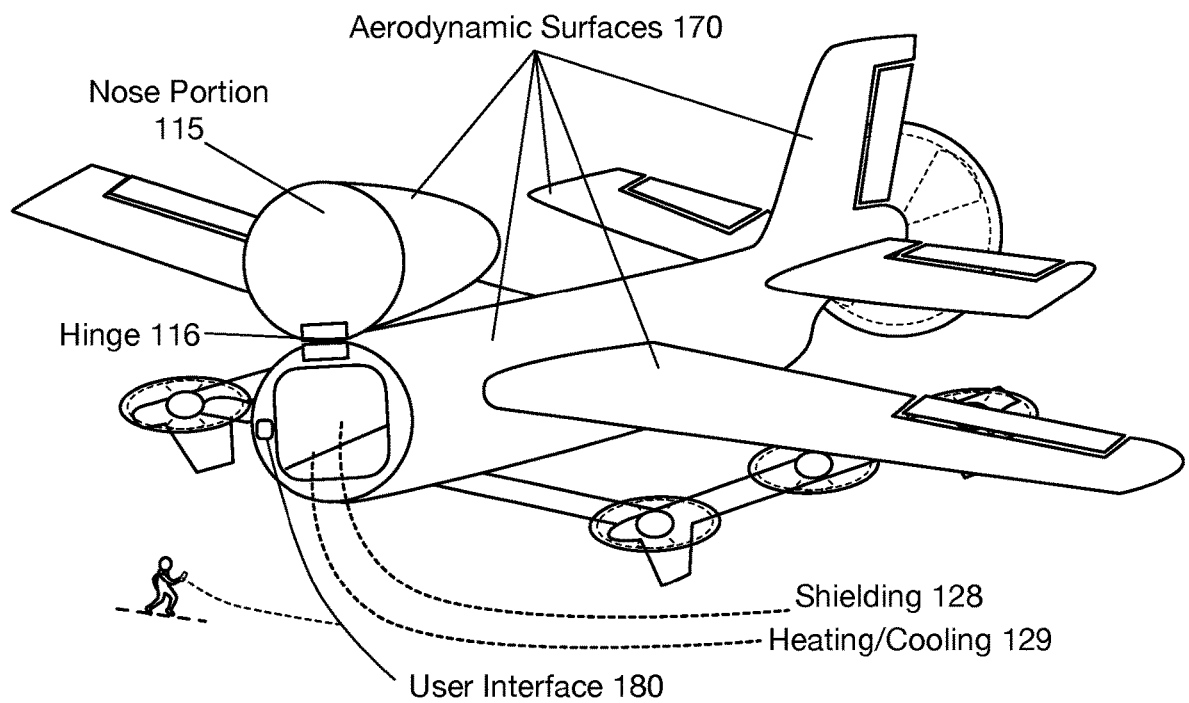
FIG. 3 depicts a configuration of an embodiment of a system for package transportation.

In some embodiments, as shown in FIG. 3, the system 100 can additionally or alternatively include one or more of: a set of surfaces 170 (e.g., fairing) configured to improve aerodynamic performance of the aerial vehicle 110; and a user interface 180 including a set of control elements associated with one or more operation modes of the system 100. Additionally or alternatively, as shown in FIG. 3, the user interface 180 can include remote interface elements (e.g., user devices) configured to communicate remotely with aerial vehicle subsystems by a wireless and/or wired connection. Furthermore, the system 100 can include intermediate wireless data relay device(s) that connect the system 100 to the cloud such that control of components can be conducted via any suitable and secure devices connected to the internet.

Additionally or alternatively, the system 100 can include architecture and structures for wireless interfaces with remote sensors (e.g., sensors for generating signals in relation to wind parameters, barometric parameters, real-time kinematic (RTK) GPS parameters, etc.), in order to enhance navigation and thus, accuracy in delivery of packages. Additionally or alternatively, system 100 can include architecture and structures for interfaces with unmanned traffic management (UTM) services that provide automated flight approvals and navigation assistance for the flight and delivery of the packages.

The system 100 functions to receive, handle, and facilitate delivery of packages, with aspects configured for loading, storing, and unloading of multiple packages in a manner that accounts for weight and balance considerations. In relation to package delivery, the system 100 functions to operate with aerodynamic efficiency, by employing novel aerodynamic surfaces. The system 100 also functions to provide features intended to improve safety of entities with which the aerial vehicle 110 interacts, for instance, by separating moving aerial vehicle parts from human and/or non-human entities during delivery, flight, and ground operations. For instance, features can include physical constraints for propellor/turbine components and/or shields, guards, or other elements configured between moving components of the flying vehicle 110 and operators/other entities.

The system 100 can be configured to implement one or more portions of the method(s) described in Sections below, but can additionally or alternatively be configured to implement other suitable methods (e.g., related to transportation of non-package entities or objects).

2.1 System—Aerial Vehicle, Storage, and Landing Support(s)

Figure 1B:
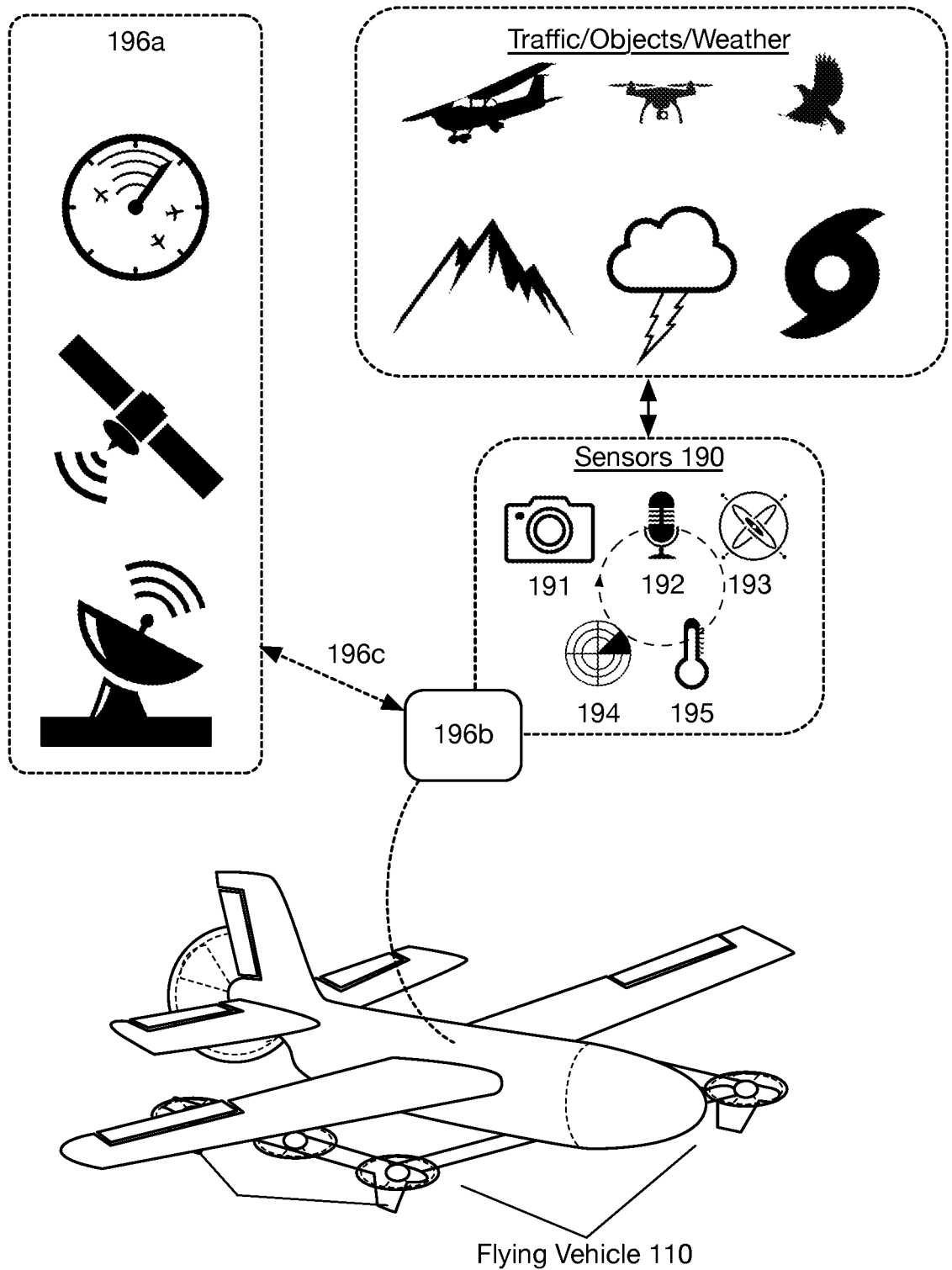
FIG. 1B depicts an embodiment of a system with functionality for detect and avoid operations.
Figure 1C:
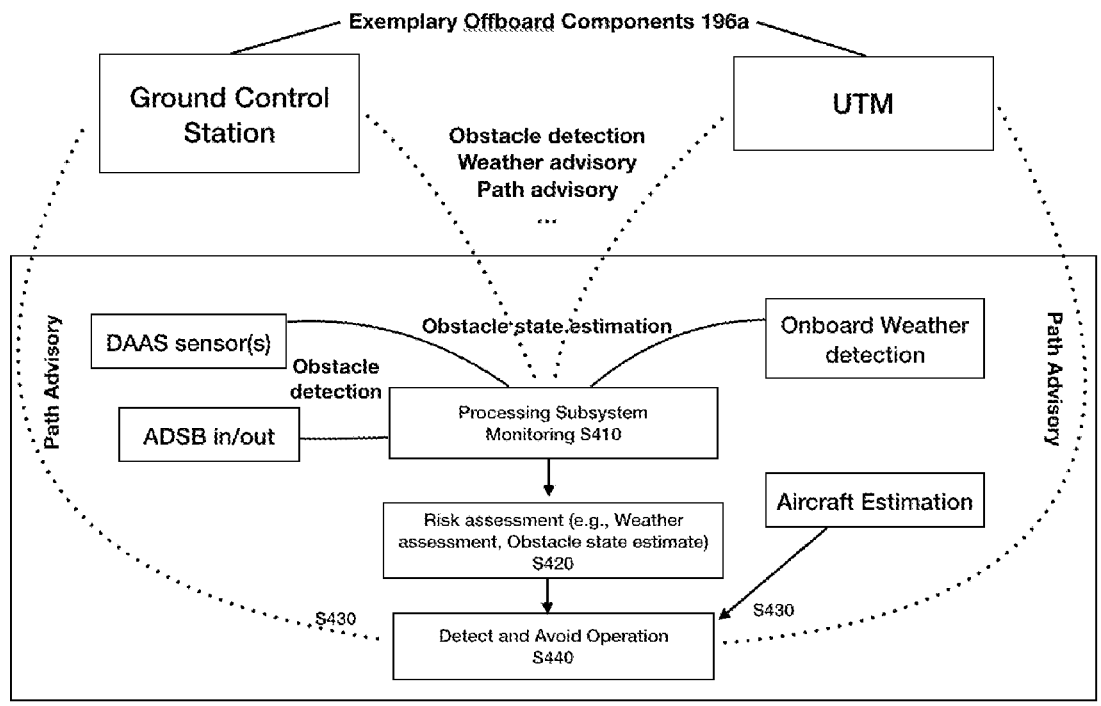
FIG. 1C depicts architecture and operation modes of an embodiment of a system/method with functionality for detect and avoid operations.

As shown in FIGS. 1A, 1B, and 1C, embodiments of a system 100 for package delivery includes: an aerial vehicle 110 including a nose portion 115 having an open mode and a closed mode; a storage region 120 within the aerial vehicle 110; and a landing support subsystem 130 coupled to the aerial vehicle 110. The aerial vehicle components function to provide reliable and consistent performance in relation to package handling, delivery, and detect and avoid system operation (e.g., with respect to avoidance maneuvers, with respect to other flight operations, with respect to ground operations, etc.) when the aerial vehicle 110 is stationary and in motion.

In embodiments, the flying vehicle 110 includes aerodynamic surfaces configured to provide lift and/or control in adjustment of roll (e.g., about a longitudinal axis), pitch (e.g., about a transverse axis), and yaw (e.g., about a vertical axis) orientations of the flying vehicle 110. In variations, such aerodynamic surfaces can include: one or more wing elements (e.g., a set of bilateral wings 113 shown in FIG. 1A, other wing configurations), one or more elevator surfaces, one or more tail surfaces (e.g., at tail region 114 shown in FIG. 1A), one or more rudder surfaces, one or more ailerons, one or more spoilers, one or more slats, one or more airbrakes, one or more vortex generators, one or more trim surfaces, one or more nose portion elements, one or more fuselage elements, one or more boom elements, and/or other suitable aerodynamic surfaces.

The aerial vehicle 110 can be manned or unmanned (e.g., remotely operated, autonomous, semi-autonomous). In variations, the aerial vehicle 110 can be classified according to one of a set of groups (e.g., unmanned aerial system tiers, etc.), such as a first group corresponding to aerial vehicles having a maximum weight from 0-20 lbs., a normal operating altitude less than 1,200 feet above ground level (AGL), and a speed of less than 100 kts; a second group corresponding to aerial vehicles having a maximum weight from 21-55 lbs., a normal operating altitude less than 3,500 feet above ground level (AGL), and a speed of less than 250 kts; a third group corresponding to aerial vehicles having a maximum weight less than 1,320 lbs., a normal operating altitude less than flight level 180, and a speed less than 250 kts; a fourth group corresponding to aerial vehicles having a maximum weight greater than 1,320 lbs., a normal operating altitude less than flight level 180, and any airspeed; and a fifth group corresponding to aerial vehicles having a maximum weight greater than 1,320 lbs., a normal operating altitude greater than flight level 180, and any airspeed. However, the aerial vehicle 110 can additionally or alternatively belong to any other category or class of aerial vehicles in another classification system.

While this description describes aspects of fixed-wing flying vehicles, multi-copter flying vehicles, quad-plane flying vehicles, vertical-takeoff-and-landing (VTOL) vehicles, and/or electric VTOL (eVTOL) vehicles, the system 100 can additionally or alternatively include components, form factors, and/or control surfaces associated with other flying vehicle types. One or more controllers described below can further be used to adjust operation of thrust generation devices (e.g., vertical thrust generating devices, forward thrust generating devices, other thrust generating devices), flying vehicle control surfaces, and/or sensor subsystem operation in relation to transitioning between operation modes described (e.g., in relation to package handling, in relation to detect and avoid operations and maneuvers, etc.), with respect to embodiments, variations, and examples of flying vehicles covered.

The flying vehicle 110 can have a predominating longitudinal axis, along which there is a forward direction and an aft direction, relative to a center of gravity (CG) of the flying vehicle 110. As noted above, the flying vehicle 110 can include a nose portion 115 having an open position and a closed position of operation, where the open position provides access for loading and/or unloading of packages using the package conveying elements described in Section 2.3 below, and the closed position is implemented during storage and/or transport of one or more packages by the flying vehicle.

In relation to transitioning of the nose portion 115 between the open position and the closed position, the flying vehicle 110 can include one or more structures that provide mechanisms for executing the open position and the closed position. In one variation, as shown in FIG. 3, the flying vehicle 110 can include a hinge 116 positioned near a dorsal portion of the nose region of the flying vehicle 110, where the hinge 116 allows the nose portion 115 to transition between open and closed positions. In transitioning the nose portion 115 between the open position and closed position, the nose portion 115 can include one or more actuators (e.g., mechanical actuators, hydraulic actuators, etc.) for opening and closing the nose portion 115. In one variation, the nose portion 115 can include one or more motors (e.g., within the nose portion) coupled to one or more drive shafts, each coupled to a gearbox configured to transform rotational motion into other motion (e.g., by way of elements linking the gearbox to appropriate positions of the nose portion 115). As such, in this and other variations, the hinge 116 can provide a node about which the nose portion 115 can rotate open or rotate closed.

Furthermore, the hinge 116 and associated mechanisms can cooperate to retain the nose portion 115 in the open position, in the closed position, and/or positions intermediate to the open position and the closed position (e.g., at discrete positions, along a continuum between the open position and the closed position). Furthermore, the nose portion 115 can include a locking mechanism (e.g., one or more latches, etc.) configured to reversibly lock the nose portion in the closed position and/or at other positions. Additionally or alternatively, mechanisms associated with the nose portion 115 can be configured for sliding of the nose portion 115 between open and/or closed positions.

As shown in FIG. 1A, the flying vehicle 110 includes a storage region 120 configured to receive one or more packages during loading phases of operation, facilitate transport of one or more packages, and deliver one or more packages during unloading phases of operation. The storage region 120 is preferably primarily internal to the flying vehicle, and functions as a cargo bay for receiving, carrying, and allowing removal of packages. In variations, the storage region 120 has a volumetric capacity from 0.25 cubic meters to 50 cubic meters; however, in other variations, the storage region 120 can have another suitable capacity. Additionally or alternatively, the storage region 120 can have a weight capacity for a set of packages having a total weight of greater than 100 lbs., with variable weight distribution; however, in other variations, the storage region 120 can have a weight capacity for a set of packages having a total weight of less than 100 lbs. (e.g., 90 lbs., 80 lbs., etc.) and/or with non-variable weight distribution. The storage region 120 can define a prismatic volume (e.g., with a constant cross section taken transverse to a longitudinal axis of the flying vehicle), or can alternatively define a non-prismatic volume.

The storage region 120 preferably has a substantially planar floor to facilitate reception of packages from the package conveying subsystem 150 described below. In relation to reception of packages, the floor can include elements (e.g., rails, tracks, rollers, a belt, etc.) that facilitate sliding of packages from the package conveying subsystem 150 into the storage region 120, during package loading onto the flying vehicle 110. Additionally or alternatively, the floor of the storage region 120 can have a terminal portion (e.g., entry region close to the nose portion 115) that is aligned with the conveyer 154 and includes features for coupling with the package conveying subsystem 150, such that the storage region 120 can provide a robust mechanism by which packages can be conveyed into the storage region 120 in a reliable manner (e.g., without undesired uncoupling from the package conveying subsystem 150). As described in more detail below, the floor of the storage region 120 can form a substantially continuous surface with the package conveying subsystem 150, when the package conveying subsystem 150 interfaces with and/or couples with the flying vehicle 110. Additionally or alternatively, the storage region 120 can include a subsystem for package relocation (e.g., a gantry coupled to a robotic arm, etc.), for moving/relocating one or more packages after initial loading of the one or more packages onto the flying vehicle 120.

Figure 4A:
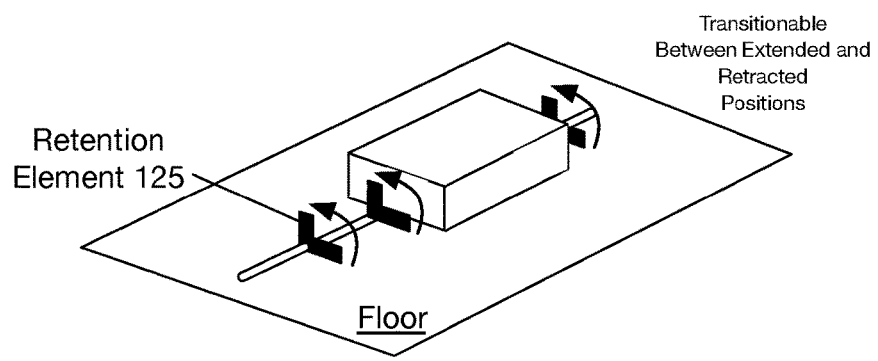
FIG. 4A depicts a portion (retention elements) of an embodiment of a system for package transportation.
Figure 4B:
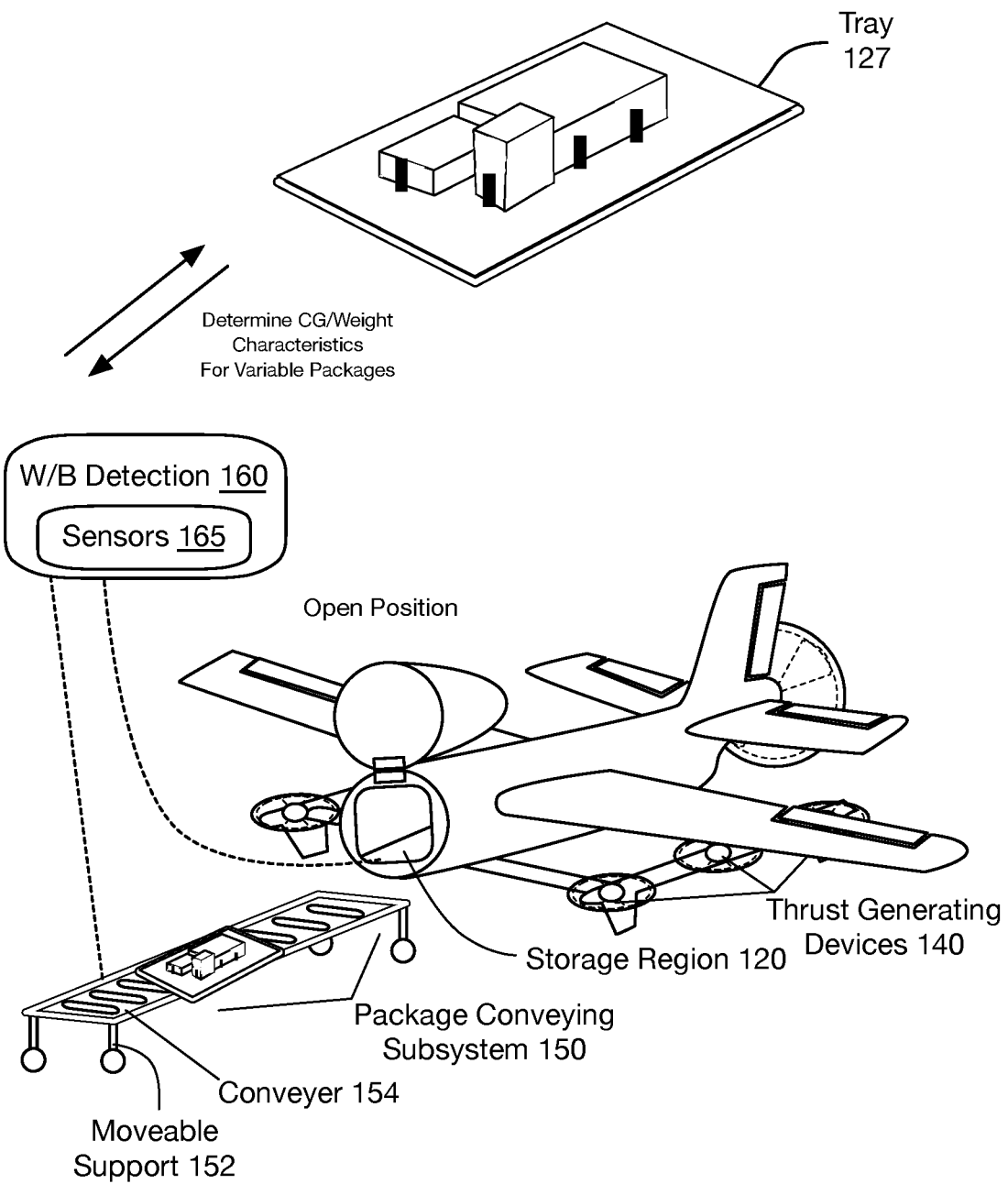
FIG. 4B depicts a portion of an embodiment of a system for package transportation, with respect to preloading of packages with variable weight distributions.

In relation to maintaining positions of the one or more packages at desired locations of the storage region 120, the flying vehicle 110 can include one or more retention elements 125 configured to prevent individual packages or groups of packages from moving away from a desired position. In variations, one of which is shown in FIG. 4, the retention elements can include one or more walls, posts, and/or bars. Furthermore, the retention elements can be fixed in position or re-adjustable. Additionally or alternatively, the retention elements can be retractable (e.g., transitionable between extended and retracted configurations), as shown in FIG. 4A, in order to provide versatility in retention options. Additionally or alternatively, as shown in FIG. 4B, the system 100 can include one or more carrier trays 127 (e.g., pallets) configured to facilitate retention and/or loading efficiency and be loaded onto the flying vehicle 110, where the carrier tray(s) 127 can be loaded with one or more packages in a configuration that accounts for weight and balance considerations, as shown in FIG. 4B. For instance, in some operation modes, the carrier tray(s) can be pre-loaded according to weight assessment, weight distribution (e.g., with respect to center of gravity or other characteristics), and/or weight redistribution operation modes enabled by the weight and balance detection subsystem 160, and the pre-loaded trays can then be loaded onto the storage region 120. In these variations, the carrier tray(s) can be retained in position relative to the flying vehicle 110, with retention of packages in the carrier tray(s) and retention of the carrier tray(s) relative to the flying vehicle 110. However, in other variations, the system 100 can be otherwise configured (e.g., without retention of individual packages).

In some variations, one or more regions of (e.g., sub-regions of, entirety of) the storage region 120 can include shielding components (e.g., shown in FIG. 3) configured to protect contents of the package(s) and/or to prevent characteristics of the package(s) from affecting operation of the flying vehicle. In variations, the shielding can be composed of a material, with suitable morphological characteristics, that provides a barrier against one or more of: thermal energy, electromagnetic energy, chemical energy, radiant energy, nuclear energy, motion (e.g., as a dampener) and any other suitable type of energy. The shielding components can be configured as one or more shells configured to house one or more packages, or can alternatively be configured in another suitable manner.

Additionally or alternatively, in some variations, one or more regions of (e.g., sub-regions of, entirety of) the storage region 120 can include isolated environments with cooling and/or heating subsystems 129 (e.g., shown in FIG. 3), in order to provide temperature controlled environments as appropriate for transport of one or more packages. In one variation, one or more subregions of the storage region 120 can provide cold storage for maintaining one or more packages in a refrigerated or frozen state. Additionally or alternatively, in another variation, one or more subregions of the storage region 120 can maintain one or more packages at room temperature or below a threshold temperature. The heating/cooling subsystems can be configured to account for ambient temperatures outside the flying vehicle 110 and/or within the storage region 120 at altitude, in order to maintain or take advantage of heating/cooling provided by the environment at various altitudes of flight operations.

In related embodiments, one or more regions of (e.g., sub-regions of, entirety of) the storage region 120 can include isolated environments for controlling pressure and/or moisture surrounding one or more packages.

As such, the storage region 120 can, in some variations, be subdivided into multiple compartments to provide suitable environments for different types of packages.

Figure 5A:
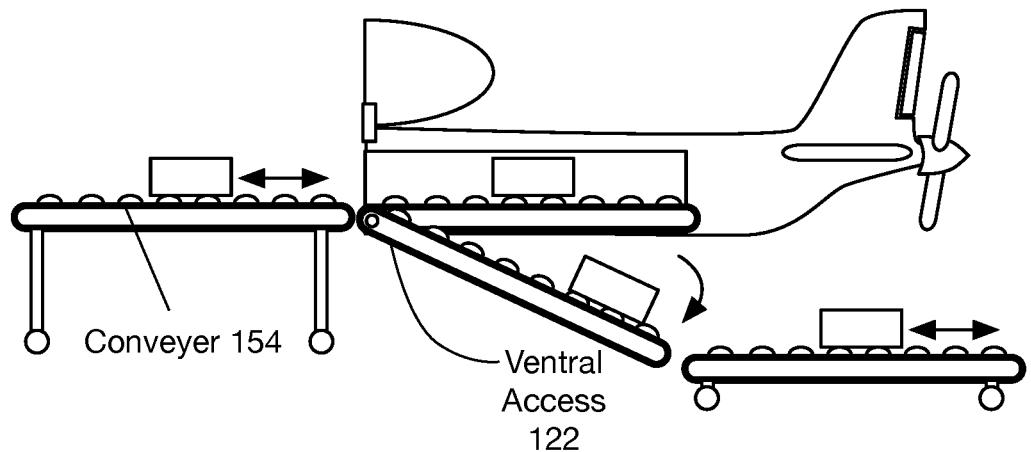
FIGS. 5A and 5B depict embodiments of loading and/or unloading portions of a system for package transportation.
Figure 5B:
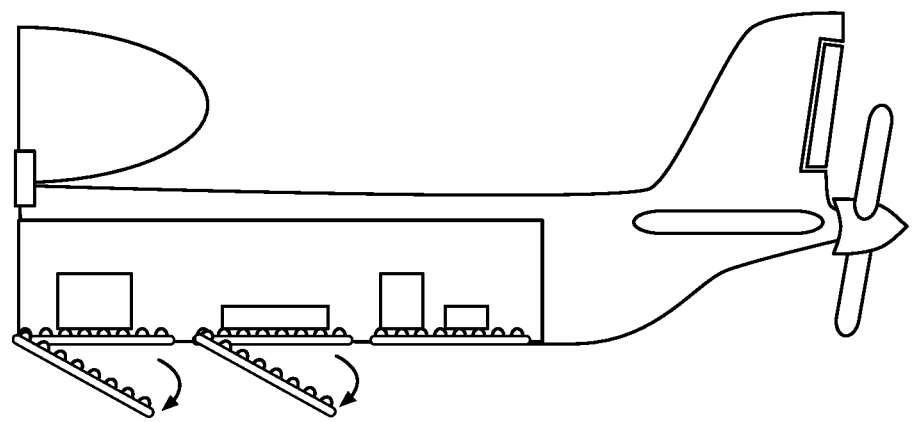

In some variations, the storage region 120 can include one or more alternative access openings (e.g., aside from the open position of the nose region 115), in order to allow unloading and/or loading of packages from the flying vehicle 110. As shown in FIGURE SA, in one variation, the flying vehicle 120 can include another access opening ventral access region 122 at the belly (e.g., ventral region) of the flying vehicle 120 (e.g., with ramp doors), in order to allow unloading of packages from the belly region. Thus, in this variation, the packages can be loaded onto and unloaded from the flying vehicle 120 in a first in, first out configuration. In this variation, the ventral access region 122 can be positioned at an intermediate floor portion of the storage region 122, in order to provide a mechanism by which one or more of the set of packages are unloaded in the package unloading mode. As shown in FIG. 5A, the intermediate floor portion/ventral access region 122 can be rotatably coupled to the flying vehicle by a hinge. The access opening(s) can, however, be configured at other suitable locations of the flying vehicle. For instance, as shown in FIG. 5B, the flying vehicle 120 can include multiple access doors for loading and/or unloading of packages.

While the storage region 120 is described above as internal to the flying vehicle 110, in variations, the storage region 120 can additionally or alternatively include sites external to the flying vehicle 120. For instance, in some variations, the flying vehicle 120 can include external structures (e.g., hard points) to which packages can be reversibly coupled. The external structures can extend from the outermost portion (e.g., skin) of the flying vehicle, or can additionally or alternatively pass through the outermost portion and extend from an internal frame of the flying vehicle, in order to provide robust sites for package loading. In variations, the external structures are positioned near the CG of the flying vehicle 120 (e.g., near wing spars, from the belly, at a dorsal surface, etc.) in order to reduce risk of undesired behavior in stationary or flight modes of the flying vehicle. Additionally or alternatively, in variations, the external structures can be positioned contralaterally about the longitudinal axis of the flying vehicle 110 to provide balance. Additionally or alternatively, the external structures can be positioned anywhere in a manner that does not adversely affect flight or stationary modes of the flying vehicle 120 (e.g., in relation to stalling characteristics, in relation to maneuvering speeds, in relation to speeds associated with maximum loads, in relation to balance when stationary, etc.). In variations including internal and external storage region aspects, the weight and balance detection subsystem 160 described in more detail below can be configured to accommodate packages distributed across internal and/or external sites of the flying vehicle 110.

Furthermore, aspects of the storage region 120 (internal and/or external to the flying vehicle 110), nose portion 115, and/or other portions of the flying vehicle 110 can support sensor subsystems and/or sensor support subsystems (e.g., for receiving signal data, for storing signal data, for relaying signal data, for communications with ground subsystems, for communications with satellite subsystems, etc.) associated with detect and avoid system operation modes. Aspects of such sensor subsystems and sensor support subsystems can be coupled to internal and/or external portions of the storage region 120 and/or flying vehicle 110 with suitable damping elements (e.g., to prevent undesired vibration artifacts or other artifacts) and shielding, in order to provide reliable performance characteristics.

As shown in FIG. 1A, the flying vehicle also includes a landing support subsystem 130, which functions to enable the flying vehicle 110 to land at a landing site, takeoff from a takeoff site, allow the flying vehicle 110 to receive packages from and/or align the flying vehicle 120 with the package conveying subsystem 150 described in more detail below. In variations, the landing support subsystem 130 can include one or more of: a conventional landing gear system (e.g., as in fixed wing aircraft), a nose gear landing system (e.g., as in fixed wing aircraft), skids (e.g., as in rotorcraft), wheels (e.g., as in rotorcraft), skis, floats, and/or any other suitable landing system. Variations of the landing support system 130 can further include fixed components and/or retractable components (e.g., in order to improve performance in flight operation modes, etc.).

The landing support subsystem 130 is configured to land on hard terrain (e.g., paved terrain, grass terrain, dirt terrain, etc.). As such, the landing support subsystem 130 can include elements (e.g., springs, dampening elements, etc.)

configured to reduce forces (e.g., G-forces) experienced by the flying vehicle 110 upon/during landing. Additionally or alternatively, the landing support subsystem 130 can be configured to land on non-hard terrain (e.g., soft surfaces, water, etc.). The landing support subsystem 130 can be configured to land on, takeoff from, and operate on substantially flat surfaces, or can additionally or alternatively be configured to land on, takeoff from, and operate on non-planar surfaces and/or moving surfaces (e.g., of an air carrier, of a vehicle configured to travel over water, of a vehicle configured to travel on land, of a vehicle configured to travel by air, etc.). For instance, one or more portions of the landing subsystem 130 can include one or more actuators configured to level the flying vehicle 110 or otherwise align a portion (e.g., storage region 120) of the flying vehicle 110 with a package conveying subsystem 150 component to reduce potential for issues during package loading or unloading.

As shown in FIG. 1A, the landing support subsystem 130 can extend from a ventral portion of the flying vehicle 110 (e.g., from supports to which one or more thrust generating devices 140 are coupled). However, in other variations, the landing support subsystem 130 can additionally or alternatively extend from other portions of the flying vehicle 110 (e.g., from undersides of wings, body, etc.). Furthermore, in variations, the landing support subsystem 130 can have multiple supports (e.g., three supports, four supports, greater than four supports, fewer than three supports, etc.), in order to provide stability during ground-based operations. Each support can be individually controllable (e.g., in variations wherein the landing support subsystem 130 is configured to land on non-planar surfaces); however, in other variations, each support may not be individually controllable (e.g., as in all-retract and all-extend gear systems).

The landing support subsystem 130 is further configured in a manner that does not obstruct loading of packages onto or unloading of packages from the flying vehicle, as well as proper operation of sensor subsystems and sensor support subsystems associated with detect and avoid system operation modes. As such, supports of the landing support subsystem 130 are preferably positioned away from the opening (s) of the nose portion 115 of the flying vehicle, and/or any other access sites.

2.2 System—Thrust Generation Devices

As shown in FIG. 1A, the flying vehicle 110 includes a set of thrust generating devices 140 including a forward thrust generation device 145, which function to, with other power plant aspects, provide thrust for takeoff, hover, landing, fixed-wing operations, transitions between VTOL and fixed-wing or other operation modes, and/or other flight and ground operations. As such, the set of thrust generating devices 140 can be configured to generate forward thrust, vertical thrust, and/or thrust along other suitable vectors defined relative to reference axes of the flying vehicle 110. In relation to the set of thrust generating devices 140, the flying vehicle 110 includes a power plant for generation of power associated with ground and flight operations, where the power plant can include one or more units of one or more of: an electric engine, a hybrid engine, a piston engine (e.g., in-line engine, V-type engine, opposed engine, radial engine, etc.), a turbine engine (e.g., a turbojet engine, a turbofan engine), a pulsejet, a rocket, a diesel engine, and any other suitable power plant system. The power plant can be coupled to an energy source (e.g., battery, fuel system, solar cell, hydrogen fuel cell, etc.) and a cooling system (e.g., forced convection cooling system, liquid cooling system, oil cooling system, etc.) for aircraft performance and operation in flight and/or during ground operations.

Thrust generating devices 140 can be optionally decoupled from the power plant by way of a clutch, transmission, gearbox, or other system. This is useful when starting the power plant, when using the power plant purely to drive an onboard generator and/or when if the ability to operate the power plant in a way that is decoupled from thrust generation (e.g., starting, idling, warming, testing and diagnostics, safety, etc.) is desired. It may also be beneficial to disconnect the power plant if it has failed and an alternative power plant (e.g., electric motor) is then used to power the thrust generating devices 140.

Furthermore, in variations, the set of thrust generating devices 140 can be configured for failsafe operation modes (e.g., with component redundancy), such that the flying vehicle 110 can still fly and/or land safely in the event of a failure of one or more components (e.g., motors, propellers, batteries, etc.).

Each of the set of thrust generating devices 140 is preferably individually controllable, in order to provide fine control of behavior of the flying vehicle 110 on the ground and/or in flight. Alternatively, one or more subsets of the set of thrust generating devices 140 can have controls coupled with other thrust generating devices of the set of thrust generating devices 140.

Each of the set of thrust generating devices 140 can include one or more blades coupled to a shaft coupled (e.g., directly, indirectly, by one or more gearboxes, clutches, joints, etc.) to the power plant(s) (e.g., motor components) of the flying vehicle 120. The one or more blades can be configured as a propeller or other rotating airfoil, that converts energy to generate thrust. The power plant(s) can drive rotational motion of the blade(s) of different thrust generating devices 140 in counterclockwise and/or clockwise modes (e.g., to provide balanced characteristics in relation to angular momentum, etc.), depending on intended flight behavior. In operation, each blade can be fixed in pitch, or can alternatively be adjustable in pitch, in order to allow the propeller to operate in more efficient orientations and change desired thrust characteristics. The blades can be constructed of a synthetic material and/or a natural material, and in variations, can be composed of one or more of (e.g., single material or composite material): a metal (e.g., steel, titanium, aluminum, etc.), a polymer, a wood-derived material, or another suitable material. The material(s) of the blade(s) is/are preferably non-brittle and have suitable mechanical and thermal properties appropriate to intended flight environments.

In variations, each thrust-generating device can include multiple blades (e.g., two blades, three blades, four blades, five blades, more than five blades). The multiple blades of a thrust-generating device can be distributed radially and symmetrically about its respective shaft. Each blade can be identical to the other blades, or can alternatively be non-identical to at least one other blade (e.g. in surface area, in cross section, in other morphological or material aspects). For instance, in some variations, a first blade or subset of blades can have a first morphology (e.g., a first width, a first length, a first surface area, a first cross sectional profile, etc.) and a second blade or subset of blades can have a second morphology (e.g., a second width, a second length, a second surface area, a second cross sectional profile, etc.). The first morphology and the second morphology can function to provide desired airflow characteristics, in relation to drag and induced turbulence (e.g., to reduce audible noise associated with spinning blades). The masses of the blade(s) of a thrust generating device can be configured to have a resultant center of gravity aligned with the shaft, or can alternatively be configured in another manner. Furthermore, in relation to forward thrust, vertical thrust, and/or thrust along another suitable axis, each thrust generating device can have its own configuration of blades optimized for providing thrust in one or more specific directions.

Figure 6:
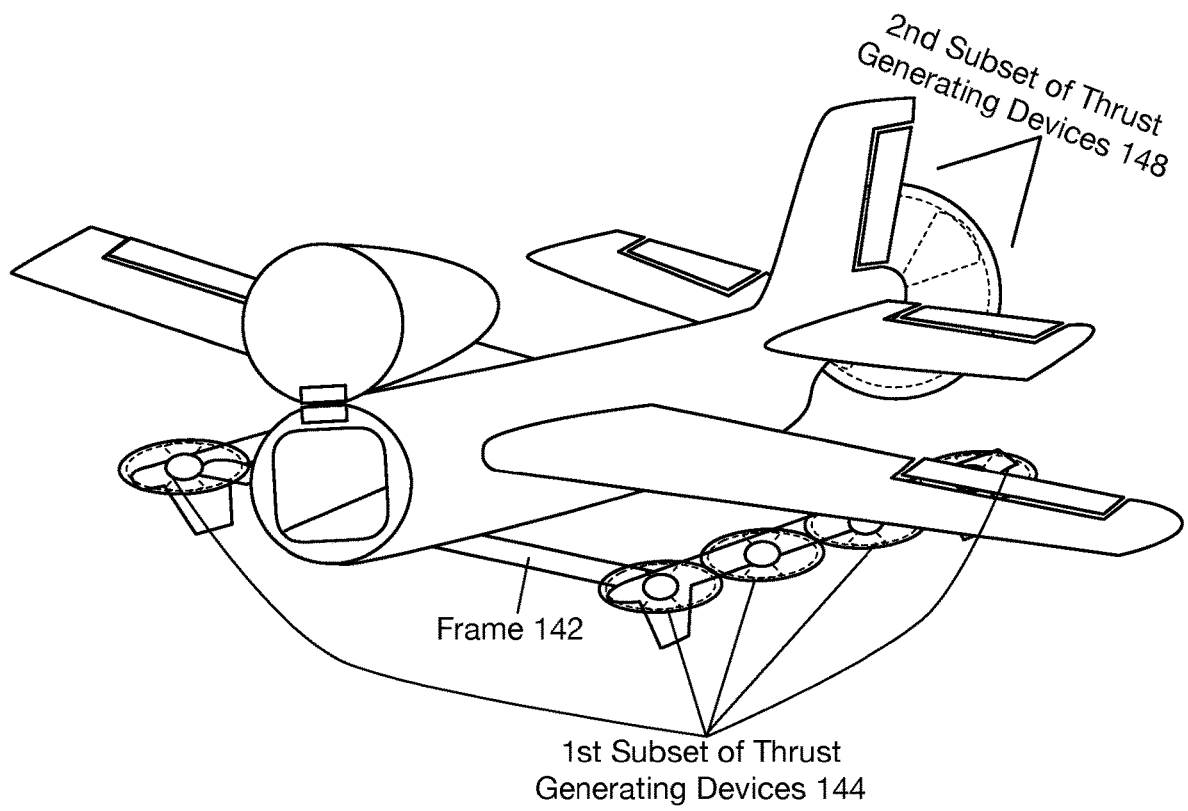
FIG. 6 depicts a configuration of an embodiment of thrust components of a system for package transportation.

In variations, one of which is shown in FIG. 6, the set of thrust generating devices 140 can have a first subset of thrust generating devices 144 and a second subset of thrust generating devices 148. The first subset of thrust generating devices 144 is coupled to a frame 142 (e.g., ventral frame) extending laterally from a reference axis (e.g., longitudinal axis, vertical axis, transverse axis) of the flying vehicle 120, where the frame orients the first subset of thrust generating devices 144 in a manner that provides primarily upward and downward forces (e.g., for vertical takeoff and landing [VTOL] operations, for other operations). However, thrust generating devices of the first subset 148 can alternatively not be provided in a plane, and/or can be configured to tilt about an axis, such that the first subset of thrust generation devices 144 is not globally configured in a plane and/or blades of each thrust generating device are not aligned with a horizontal plane. In variations, tilted rotors can be configured to provide roll, pitch, and/or yaw control and/or other control aspects, in relation to providing desired thrust vectors.

In variations, one of which is shown in FIG. 6, the first subset of thrust generating devices 144 can include an even number of propellers distributed symmetrically about the longitudinal axis of the flying vehicle 110. However, in other variations, the flying vehicle 110 can include another suitable number of thrust generating devices (e.g., odd number of thrust generating devices) symmetrically or non-symmetrically configured about another reference axis of the flying vehicle 110. In the variation shown in FIG. 6, the first subset of thrust generating devices 144 includes eight propellers, four on each contralateral side of frame 142; however, in other variations, the set of thrust generating devices can include another suitable number of propellers (e.g., 3 propellers, 5 propellers, less than 3 propellers, greater than 5 propellers). As such, the first subset of thrust generating devices 144 can include greater than or equal to four, or less than four thrust generating devices. As shown in FIG. 1A, the first subset of thrust generating devices 144 can be coupled to the ventral frame 142 and symmetrically distributed about a longitudinal axis of the flying vehicle 110; however, in other variations, the first subset can be otherwise distributed and configured relative to the flying vehicle 110.

In variations, one of which is shown in FIG. 6, the flying vehicle 110 can include a second subset of thrust generating devices 148, including a forward thrust generation device, which functions to provide thrust along one or more vectors different from thrust vectors of the first subset of thrust generating devices 144. As shown in FIGS. 1A and 6, the forward thrust generating device 145 can be positioned at a portion of the aircraft aft of the CG, in order to position moving blades away from loading and/or unloading positions of the flying vehicle 110, for safety purposes. As such, in a specific example, the forward thrust generating device 145 can be positioned at the tail region 114 of the flying vehicle, as shown in FIG. 1A. However, in other variations, the second subset of thrust generating devices 148 can include more than one forward thrust generating devices coupled to other portions of the flying vehicle (e.g., contralaterally, extending from the flying vehicle 110 near the leading edge of each wing, extending from the flying vehicle 110 near the trailing edge of each wing, near the nose portion, etc.). Furthermore, in relation to a hybrid system, the forward thrust generating device(s) 145 can provide thrust, while other power plant aspects (e.g., engines) can additionally be used for thrust (e.g., via a planetary gearbox) in addition to for other purposes (e.g., recharging batteries, etc.) via power take-off devices (e.g., electric motors).

Figure 7:
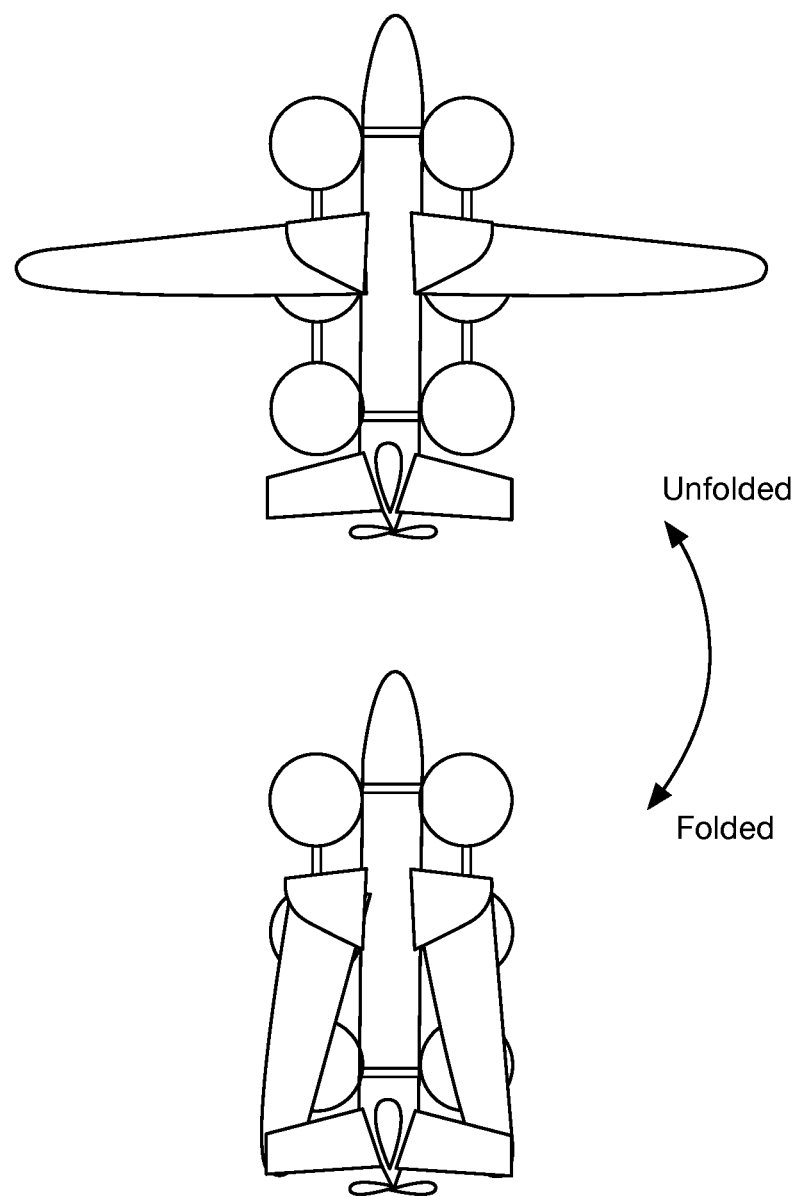
FIG. 7 depicts folded and unfolded configurations of an embodiment of thrust components, aerodynamic surfaces, and wings of a system for aerial cargo transportation.

In variations, one or more of extended portions of the flying vehicle 110 (e.g., wings) and/or the set of thrust generating devices 140 can be configured to extend outward away from the fuselage of the flying vehicle 110 and/or to retract inward toward the fuselage of the flying vehicle 110. As such, in some variations, one or which is shown in FIG. 7, one or more of the wings and/or thrust generating devices 140 can fold or rotate inward and/or outward, in order to provide more compact configurations of the flying vehicle 110 (e.g., for transport of the flying vehicle 110), and/or to affect flight characteristics.

In some variations, moving portions (e.g., blades) of the set of thrust generating devices 140 can be surrounded by a cage or other shield (e.g., duct), in order to prevent entities from contacting the moving portions, while still allowing the set of thrust generating devices 140 to provide suitable thrust for operation. However, variations of the set of thrust generating devices 140 can alternatively omit a cage or other shield.

In relation to detect and avoid operations described further below, detect and avoid system (DAAS) architecture can be used to change behavior of the set of thrust generating devices. For instance, behavior changes can include or operate by way of transitions between power settings for forward thrust generating devices and/or vertical thrust generating devices for fixed wing and VTOL flight modes, increases in speed, decreases in speed, execution of a turn, execution of a climbing operation, execution of a descending operation, and/or other operations governed by adjustment of thrust.

2.3 System—Package Conveyer and Weight and Balance Detectors

As shown in FIG. 1A, the system 100 also includes a package conveying subsystem 150, which functions to facilitate pre-loading of packages and/or loading of packages onto the flying vehicle 110, and/or to stage the set of packages and interface with the flying vehicle 110. During operation, as described in more detail below, the package conveying subsystem 150 is configured to interface with the nose portion 115 of the flying vehicle 110 in the open position, in order to facilitate transfer of packages from the package conveying subsystem 150 and onto the flying vehicle in a robust and reliable manner.

In the embodiment shown in FIG. 1A, the package conveying subsystem 150 includes a moveable support 152 and a conveyer 154 supported by the moveable support 152, where the moveable support 152 positions and/or elevates the conveyer 154 into alignment with the floor of the storage region 120, such that packages can be transferred from the conveyer 154 to the storage region 120. However, as described above, alignment can additionally or alternatively be enabled by the landing support subsystem 130. As described above, the conveyer 154 of the package conveying subsystem 150 can be configured to form a substantially continuous surface with the floor of the storage region 120 during loading of the flying vehicle 120, when the package conveying subsystem 150 interfaces with the flying vehicle 110.

As shown in FIG. 1A, the moveable support 152 of the package conveying subsystem 150 can include a set of legs with wheels (e.g., caster wheels) that allow the moveable support 152 to be positioned into alignment with the floor of the storage region 120 of the flying vehicle 110 in the open position. In variations, the one or more of the legs of the moveable support 152 can be adjustable in height, in order to allow the conveyer 154 to align with the floor of the storage region 120 regardless of the terrain on which the flying vehicle 120 and/or the moveable support 152 are situated during loading of packages from the conveyer 154 to the storage region 120. Alignment can be performed automatically (e.g., using optical sensors, using other sensors configured for matching of alignment markers) or manually. However, the legs of the moveable support 152 can alternatively be non-adjustable in height. In relation to coupling between the package conveying subsystem 150 and the storage region 120/flying vehicle 110, the system 100 can be configured to interface the package conveying subsystem 150 with the flying vehicle 110 prior to leveling and/or after levelling the package conveying subsystem 150.

As shown in FIGS. 1A and 5, the conveyer 154 functions to transfer packages onto the floor of the storage region 120. In a first variation, as shown in FIGS. 1A and 5, the conveyer 154 can include a set of rollers that can individually rotate about respective pins, in order to transfer packages from the conveyer 154 to the storage region 120. Each of the set of rollers can be controlled individually, in order to provide a mechanism for controlling movement of individual packages on the conveyer 154 independently of other packages. In another variation, the conveyer 154 can include a belt for transferring packages from the package conveying subsystem 150 to the storage region 120. Surfaces of the conveyer 154 can be textured or otherwise provide a high friction surface (e.g., with gripping material) in order to prevent slipping of packages. Transfer of packages from the conveyer 154 to the storage region 120 can be automatically controlled (e.g., in coordination with a controller that receives weight and balance data from the weight and balance detection subsystem 160 described below), where one or more packages that satisfy weight and balance requirements can be automatically transferred from the conveyer 154 to the storage region 120. Additionally or alternatively, operation of the conveyer 154 can at least partially be manually controlled (e.g., by an operator).

In relation to alignment with the floor of the storage region 120, a portion (e.g., forward facing portion) of the package conveying subsystem 150 can include one or more alignment and/or locking features (e.g., protrusions, recesses, latches, magnetic components, etc.) for at least temporarily fixing the position of the conveyer 154 relative to the floor of the storage region 120. In these embodiments, the open position of the nose portion 115 can be configured to expose alignment and/or locking features that are complementary with those of the package conveying subsystem 150.

In variations, the package conveying subsystem 150 can include a second unit of the moveable support and conveyor, in order to load and/or unload packages from other access openings of the storage region. For instance, the second unit can have shorter legs to receive and unload packages from the belly region of the flying vehicle 120 (e.g., through ramp doors). Additionally or alternatively, the first unit of the package conveying subsystem 150 can be configured to be height adjustable to load and/or unload packages from all access openings into and/or out from the storage region 120.

As shown in FIG. 1A, the system 100 can include a weight and balance detection subsystem 160 comprising a set of sensors 165 coupled to at least one of the flying vehicle 110 and the package conveying subsystem 150. The weight and balance detection subsystem 160 functions to provide weight and balance information associated with pre-loading of packages (e.g., onto the package conveying subsystem) and/or packages loaded onto the flying vehicle 110, in a dynamic manner. As such, weight and balance of the flying vehicle 120 can be maintained in suitable ranges during phases of ground and/or flight operations of the flying vehicle 120.

In variations, the set of sensors 165 can include force sensors and/or strain sensors. Additionally or alternatively, the set of sensors 165 can include other types of sensors for indirectly measuring force (e.g., optical sensors configured to detect deformation of a substrate loaded with packages, etc.). For instance, in some variations, center of gravity aspects can be sensed from indirectly or directly measuring relative amounts of fore and aft thrust forces (e.g., of vertical take off and landing components) during hover or other phases of flight. For instance, thrust can be inferred by characterizing relationships between RPM values of fore and aft motors.

In variations, the set of sensors 165 is coupled to the landing support subsystem 130 (e.g., gear legs, wheels, skids, etc.) of the flying vehicle 120, such that the weight and balance detection subsystem 160 can generate weight and balance data of the flying vehicle 110 continuously, in relation to package configurations as packages are loaded onto and/or unloaded from the flying vehicle. Additionally or alternatively, the set of sensors 165 can include sensors coupled to another portion of the flying vehicle 110, such as to the floor of the storage region 120 of the flying vehicle. In these variations, the set of sensors 165 can be configured to account for weight and balance considerations of the flying vehicle 120, with respect to empty weight characteristics, weights of packages loaded internal to the flying vehicle 120, and/or weights of packages secured to external hard points of the flying vehicle 120.

Additionally or alternatively, the set of sensors 165 can include sensors coupled to the package conveying subsystem 150, such as to the moveable support 152 and/or conveyer 154 of the package conveying subsystem 150. Coupling of sensors to the package conveying subsystem 150 can enable operation modes associated with pre-sorting of packages and optimizing configurations of packages prior to loading onto the flying vehicle. In variations, the system 100 can be configured to pre-sort packages based on one or more of: individual weights and/or CGs of packages, global weights and/or CGs of a set of packages (e.g., a pallet), volumes of one or more packages, shapes of one or more packages, delivery sequences of packages, contents of packages (e.g., in relation to environmentally-constrained storage requirements), and/or other variables. As such, the weight and balance detection subsystem 160 can cooperate with a processor and/or controller of the system 100 to assess characteristics of the set of packages and design pre-arranged configurations of packages prior to loading, based upon a set of factors/requirements.

In relation to pre-sorting, the package conveying subsystem 150 can include one or more feeders, which function to receive a subset of packages intended to be loaded onto the flying vehicle 120, and to load them onto the conveyor 154 in a desired sequence associated with weight and balance considerations and/or other considerations.

The weight and balance detection subsystem 160 can also provide data that processor/controller elements of the system 100 can use to control apparatus for positioning and/or repositioning of packages within the storage region 120. For instance, the positioning apparatus can be configured to, based on weight and balance data, readjust positions of one or more packages during operation, based on one or more of: unloading of one or more packages during delivery, pickup of one or more packages or other objects during a mission (e.g., along a delivery route with one or more delivery/pickup events), movement of packages during operation of the flying vehicle, weight and balance requirements during various phases of operation (e.g., flight operations, ground operations) of the flying vehicle, and other considerations.

In relation to detect and avoid operations described further below, the package conveying subsystem 150 can further include or implement detect and avoid system (DAAS) architecture to adjust operation during package conveying (e.g., dropping of packages during delivery). For instance, during a package dropping operation, the DAAS architecture can implement outputs of subsystems (e.g., vision-based sensor subsystems, acoustic sensor subsystems, thermal sensor subsystems, other subsystems, etc.) described below to determine that there are no entities (e.g., people, animals, etc.), property, plant life (e.g., landscaping), or other objects that could be endangered by, react to, or otherwise be damaged by a falling package. In such events, the package conveying subsystem 150 can be configured to adjust timing (e.g., postpone) package delivery, drop a package from a different altitude, execute a maneuver to adjust a trajectory of a package (e.g., by waiting in a hover mode, by selecting another drop location, by alerting a remote operator or other entity, etc.), and/or execute another suitable operation.

2.4 System—Additional Elements

In some embodiments, the system 100 can additionally or alternatively include a set of surfaces 170 (e.g., fairings) configured to improve aerodynamic performance of the flying vehicle 110. The set of surfaces 170 can be configured to surround individual portions of the flying vehicle 110 (e.g., wing struts, landing supports, etc.), or can alternatively function to surround larger portions of the flying vehicle 110. In variations, the set of surfaces 170 can include a fairing surrounding the storage region 120 (e.g., cargo bay), and one or more fairings surrounding vertical takeoff and landing components of the flying vehicle 120. However, in other variations, the set of surfaces 170 can include fairings for any other suitable portion of the flying vehicle (e.g., pods surrounding portions to which packages are secured external to the flying vehicle).

The set of surfaces 170 can be formed from materials configured with appropriate physical properties (e.g., mechanical properties, thermal properties, electrical properties, etc.) and/or selected based upon manufacturing considerations. In variations, the set of surfaces 170 can be formed from one or more of: metallic materials, composite materials, polymers, and/or other suitable materials.

In variations, the set of surfaces 170 are configured to provide waterproofing for appropriate regions of the flying vehicle (e.g., to prevent water from entering the storage region 120, etc.) and/or can include surface features for routing fluid away from sensitive portions of the flying vehicle 110. However, the set of surfaces 170 can additionally or alternatively be configured to perform other suitable functions (e.g., heating/cooling functions, de-icing functions, functions for increasing drag with speed brakes, etc.).

In some embodiments, the system 100 can additionally or alternatively include a user interface 180 including a set of control elements associated with one or more operation modes of the system 100. The user interface 180 can include control elements that allow a human operator or other entity to perform one or more functions associated with loading of packages onto the flying vehicle 110, unloading of packages from the flying vehicle 110, flight operations, ground operations, and/or any other suitable functions (e.g., modifying operation of thrust generating devices, such as for safety reasons, pre-charging capacitor elements, adjusting operation of power plant components, adjust battery operation states, adjusting braking system states, etc.). The user interface 180 can include indicator elements that indicate system statuses associated with one or more of: electrical systems (e.g., battery statuses), powerplant operation (e.g., fuel levels, temperatures, pressures, etc.), weight and balance characteristics (e.g., within range, out of range, etc.), transitions into and/or from various modes of operation (e.g., nose opening, nose closing, alignment between conveyer and storage region, opening and closing of other access openings into the storage region, flight operation modes, delivery modes, etc.), and/or any other suitable system statuses (e.g., statuses of locks, such as electromechanical locks, at the nose portion 115, statuses of cargo bay doors, etc.).

The system 100 can, however, additionally or alternatively include other elements configured to support operation of the flying vehicle and its associated missions. For instance, the system 100 can include components for performing diagnostics, in relation to generating outputs regarding subsystem statuses (e.g., normal operation, abnormal operation, health reporting, etc.) and/or maintenance requirements for subsystems. Such support operations can be performed within visual line of sight or non-visual line of sight with the flying vehicle 110 (e.g., by way of a connection to the cloud or in another suitable manner).

2.5 System—Detect and Avoid Sensor System and Support

In embodiments (as shown in FIG. 1B), the system 100 can further include a sensor subsystem 190 including one or more sensors that provide capabilities in VFR, IFR, and/or other environmental conditions, where the sensors of the sensor subsystem 190 can include one or more of: vision-based sensors, acoustic-based sensors, radar components, thermal sensors, and other sensors positioned around the aircraft to provide full coverage (e.g., 360-degree coverage). The sensor subsystem 190 can additionally have redundancy for each necessary detect and avoid sensor. Furthermore, the sensor subsystem 190 can operate with a controller 90 having architecture for switching reliance upon different sensor subsets of the sensor subsystem 190 based upon detected environmental conditions associated with VFR, IFR, and/or other types of environmental conditions.

The sensor subsystem 190 functions to provide sensing functionality across a wide range of conditions (e.g., environmental conditions, weather conditions, potential system failure conditions, etc.), and thereby includes architecture for switching between reliance upon different sensor subsets, as well as sensor redundancy.

2.5.1 Vision-Based Sensors

In embodiments, the sensor subsystem 190 can include one or more vision-based sensors mounted to the flying vehicle 110, where the vision-based sensors can be incorporated with an optical detection subsystem 191 including sensors configured to capture optically-observable features from the environment of the sensors/flying vehicle 110. In particular, the optical detection subsystem 191 includes sensors for observing features of objects along a path of operation of the flying vehicle 110, and/or any other suitable object aspects to facilitate detect and avoid operation modes of the flying vehicle 110.

Sensors of the optical detection subsystem 191 can detect features in the visible spectrum, or can additionally or alternatively detect features in non-visible spectral ranges (e.g., with infrared (IR) sensors, with ultraviolet (UV) sensors, with sensors structured to detect features in other electromagnetic spectrum ranges). The optical detection subsystem 191 can also include optical elements (e.g., lenses, filters, mirrors, polarizers, apertures etc.) for adjusting or shaping aspects of light reaching sensors of the optical detection subsystem 191. In relation to detection of environmental parameters (e.g., moisture, particulate matter due to smoke, forms of water, dust particles, etc.), the optical detection subsystem 191 can include one or more filters, polarizers, and/or lenses optically coupled to or otherwise aligned with the sensors, and configured to detect spectra of light from features associated with such environmental parameters. In relation to detection of traffic and other objects (e.g., aerial vehicle traffic, flying objects, organisms, non-aerial traffic, etc.), the optical detection subsystem 191 can include one or more filters, polarizers, and/or lenses optically coupled to or otherwise aligned with the sensors, and configured to detect spectra of light from features (e.g., aircraft lighting systems, aircraft paint or other surface coatings, flying object broadcasted optical features, etc.) associated with such traffic and other objects. Additionally or alternatively, in relation to detection of lighting systems or other identifying objects of landing sites, the optical detection subsystem 191 can include one or more filters, polarizers, and/or lenses optically coupled to or otherwise aligned with the sensors, and configured to detect spectra of light from features (e.g., lighting systems in accordance with Federal Aviation Administration Advisory Circular 150/ 5345-46E, runway markings, runway signage, VTOL landing sites, etc.). Variations of the optical detection subsystem 191 can, however, have any other suitable sensor types and/or optical elements associated with visible spectra and/ or non-visible spectra electromagnetic radiation.

In variations, the optical detection subsystem 191 can include passive sensors (e.g., structured to receive signals) and/or active sensors (e.g., structured to emit and receive returned light signals) including one or more of: a light detection and ranging (LIDAR) system, laser detection and ranging (LADAR) system, an infrared or forward-looking infrared (FLIR) system, and/or other suitable optical detection subsystems.

The optical detection subsystem 191 can have one or more units (e.g., cameras) structurally mounted to the flying vehicle 110 and positioned so as to provide one or more fields of view relevant to operation of the flying vehicle 110, as the flying vehicle 110 traverses through space (e.g., during flight operations, during ground operations, during movement operations, etc.) and/or prepares to move through space. Multiple subunits of the optical detection subsystem 191 can be used for system redundancy (e.g., in the event a subset of subunits have occluded optical elements) and/or for providing different field of view options. The camera(s) of the optical detection subsystem 191 can be coupled to an interior portion of the flying vehicle 110, or can be coupled to an exterior portion of the flying vehicle 110. Mounting positions are associated with desired flight paths associated with a mission (e.g., delivery mission), detect and avoid operations, takeoff, landing, and/or other suitable operations. In one variation, the optical detection subsystem 191 can have one or more camera units positioned with a field of view of up to 360 degrees about the flying vehicle 110. For instance, the one or more camera units can be positioned toward or at a nose region, toward or at a belly region, toward or at a dorsal region, toward or at landing support subsystem 130 regions (e.g., associated with VTOL/eVTOL operations), toward or at other surfaces of the set of surfaces 170, and/or otherwise positioned. In one variation, the optical detection subsystem 191 can additionally or alternatively have a first camera unit mounted toward a port side of the flying vehicle 110 (e.g., for left traffic detection), a second camera unit mounted toward a starboard side of the flying vehicle 110 (e.g., for right traffic detection), a third camera mounted toward a nose region of the flying vehicle 110 (e.g., for forward traffic detection), a fourth camera mounted at a belly region (e.g., with a field of view generally downward) for takeoff and landing operations and/or operations associated with package dropping and/or pickup, and/ or any other suitable camera units mounted at any other suitable portion of the flying vehicle 110.

Subunits of the optical detection subsystem 191 can thus be fixed in position. The subunits(s) of the optical detection subsystem 191 can alternatively be adjustable in position based on operation modes of the flying vehicle 110. For instance, camera positions, fields of view, and/or operation modes can be adjusted depending upon operation in a fixed-wing operation mode and a VTOL/eVTOL operation mode, and the controller 90 can include architecture for adjusting operational transitions of the optical detection subsystem 191 between different modes. The optical detection subsystem 191 can thus include actuators coupled to the subunit(s) of the optical detection subsystem 191 and/or position encoders coupled to the actuators, in relation to electronic control of camera unit positions. Additionally or alternatively, the controller 90 can provide control instructions for adjusting field of view (e.g., wide angle, non-wide angle) of each subunit of the optical detection subsystem 191 in relation to movement operation modes of the flying vehicle 110, detected traffic, detected weather conditions, and/or other triggering events. In relation to image stabilization, the subunit(s) of the optical detection subsystem can be coupled to image stabilization subsystems (e.g., gimbals) to reduce artifacts due to vibration or other undesired image artifacts that would otherwise be included in image data generated from the optical detection subsystem 191.

2.5.2 Acoustic Sensors

In embodiments, the sensor subsystem 190 can include one or more acoustic sensors mounted to the flying vehicle 110, where the acoustic sensors can be incorporated with an acoustic sensor subsystem 192 including sensors configured to capture soundwave or vibration-associated features from the environment of the sensors/flying vehicle 110. In particular, the acoustic sensor subsystem 192 includes sensors for detecting soundwaves or vibrations associated with objects and/or the environment about a path of operation of the flying vehicle 110, and/or any other suitable aspects to facilitate detect and avoid operation modes of the flying vehicle 110.

Sensors of the acoustic sensor subsystem 192 can detect features frequency ranges and/or resonant frequency ranges associated with different types of air traffic (described above), in relation to vibrational frequencies, buffeting frequencies, fluttering frequencies, noise, and/or other types of sound energy. In examples, frequency ranges can be less than 20 Hz or alternatively greater than 20 Hz. Sensors of the acoustic sensor subsystem 192 can further be structured to detect acoustic energy associated with different amplitudes (e.g., as measured in decibels, as measured in another unit) associated with air traffic, other moving objects, and/or other stationary objects described above. Additionally or alternatively, sensors of the acoustic sensor subsystem 192 can detect other sound/vibration parameters associated with air traffic, other moving objects, and/or other stationary objects including one or more of: wave propagation velocity, acoustical velocity, intensity, pressure level, and/or other properties.

The acoustic sensor subsystem 192 can also include signal processing elements (e.g., filters, sound-shaping elements, sound-focusing elements, sound transducing chambers, etc.) for adjusting or shaping aspects of sound or other vibrational energy reaching sensors of the acoustic sensor subsystem 192.

In relation to detection of traffic and other objects (e.g., aerial vehicle traffic, flying objects, organisms, non-aerial traffic, etc.), the acoustic sensor subsystem 192 can include one or more filters or other sound modulating elements in communication with or otherwise cooperating with the sensors, and configured to detect sound parameters (e.g., frequencies, resonant frequencies, amplitude characteristics, wave propagation velocity, acoustical velocity, intensity, pressure level, etc.) from features (e.g., vibrational signals produced by moving components, such as engine-coupled elements or moving control surfaces, of other traffic, sound signals produced by moving objects, sound signals produced by stationary objects, etc.) associated with such traffic and other objects about a movement path of the flying vehicle 110. Variations of the acoustic sensor subsystem 192 can, however, have any other suitable sensor types and/or acoustic elements.

Acoustic sensors of the acoustic sensor subsystem 192 can include passive sensors (e.g., structured to receive signals) and/or active sensors (e.g., structured to emit and receive returned acoustic signals). Passive and/or active sensors can further be used to determine distances to and/or other motion characteristics of other objects in the vicinity of the flying vehicle 110. For instance, the acoustic sensor subsystem 192 can include one or more ultrasonic sensors with associated microphones structured to determine the distance to an object by generating acoustic waves and determining time durations between signal transmission and reception of returned signals (e.g., echoes) from one or more objects.

The acoustic sensor subsystem 192 can have one or more units (e.g., microphones) structurally mounted to the flying vehicle 110 and positioned so as to provide the ability to receive acoustic signals from one or more detection zones relevant to operation of the flying vehicle 110, as the flying vehicle 110 traverses through space (e.g., during flight operations, during ground operations, during movement operations, etc.) and/or prepares to move through space. Multiple subunits of the acoustic sensor subsystem 192 can be used for system redundancy (e.g., in the event a subset of subunits are hindered by noise or fail in another manner) and/or for providing different detection zone options.

The subunits of the acoustic sensor subsystem 192 can be coupled to an interior portion of the flying vehicle 110, or can be coupled to an exterior portion of the flying vehicle 110. Mounting positions are associated with desired flight paths associated with a mission (e.g., delivery mission), detect and avoid operations, takeoff, landing, and/or other suitable operations. In one variation, the acoustic sensor subsystem 192 can have one or more acoustic sensor units positioned with an aggregate detection zone of up to 360 degrees about the flying vehicle 110. For instance, the one or more acoustic sensor units can be positioned toward or at a nose region, toward or at a belly region, toward or at a dorsal region, toward or at landing support subsystem 130 regions (e.g., associated with VTOL/eVTOL operations), toward or at other surfaces of the set of surfaces 170, and/or otherwise positioned. In one variation, the acoustic sensor subsystem 192 can additionally or alternatively have a first acoustic sensor unit mounted toward a port side of the flying vehicle 110 (e.g., for left object detection), a second acoustic sensor unit mounted toward a starboard side of the flying vehicle 110 (e.g., for right object detection), a third acoustic sensor unit mounted toward a nose region of the flying vehicle 110 (e.g., for forward object detection), and/or any other suitable subunits mounted at any other suitable portion of the flying vehicle 110.

Subunits of the acoustic sensor subsystem 192 can thus be fixed in position. The subunits(s) of the acoustic sensor subsystem 192 can alternatively be adjustable in position based on operation modes of the flying vehicle 110. For instance, positions, detection zones or directions, and/or operation modes can be adjusted depending upon operation in a fixed-wing operation mode and a VTOL/eVTOL operation mode, and the controller 90 can include architecture for adjusting operational transitions of the acoustic sensor subsystem 192 between different modes. The acoustic sensor subsystem 192 can thus include actuators coupled to the subunit(s) of the acoustic sensor subsystem 192 and/or position encoders coupled to the actuators, in relation to electronic control of sub unit positions.

2.5.3 Motion and Trajectory Sensors

In embodiments, the sensor subsystem 190 can additionally or alternatively include one or more motion and trajectory sensors 193 that function to generate signals pertaining to position, velocity, and/or acceleration of the flying vehicle 110. Additionally or alternatively, the motion and trajectory sensors 193 can generate signals pertaining to specific force, angular rate, and/or magnetic field surrounding the flying vehicle 110 in association with trajectory of the flying vehicle 110. The motion and trajectory sensors 193 can include one or more inertial measurement units (IMUs), where outputs can be processed with outputs of other subsystem outputs to determine motion-associated states of the flying vehicle 110 during various operation modes and/or detect and avoid maneuvers. The motion and trajectory sensors 193 can include one or more accelerometers, one or more gyroscopes, one or more compasses, one or more airspeed indicators, one or more vertical speed indicators, one or more turn-and-bank sensors, one or more g-meters, one or more global positioning system (GPS) components, and can include one or more magnetometers, where any or all of the elements can be associated with a pitch axis, a yaw axis, and a roll axis of the flying vehicle 110. Components of the motion and trajectory sensors 193 can be coupled to the flying vehicle 110, and can be positioned internal to the flying vehicle 110 and/or mounted to an exterior portion of the flying vehicle 110. In relation to measurement facilitation and/or post-processing of data form the motion and trajectory sensors 193, the motion and trajectory sensors 193 can be coupled to a vibration dampener for mitigation of data artifacts from sources of vibration (e.g., engine vibration) or other undesired signal components.

2.5.4 Other Sensors and Weather Detection

In embodiments, the sensor subsystem 190 can additionally or alternatively include a radar subsystem 194 coupled to the flying vehicle 110. The radar subsystem 194 includes structures for detecting radar-responsive (e.g., reflective, scattering, absorbing, etc.) objects and/or other weather or environmental features associated with a path of motion of the flying vehicle 110. In embodiments, the sensor subsystem 190 can additionally or alternatively include a thermal sensor subsystem 195 coupled to the flying vehicle 110 and including one or more sensors for detecting thermal signatures of objects associated with a path of movement of the flying vehicle 110. Additionally or alternatively, the flying vehicle 110 can include other sensor types (e.g., magnetic sensors, etc.). In manners analogous to those described above, the sensors can include multiple subunits for system redundancy (e.g., in the event a subset of subunits are hindered by noise or fail in another manner) and/or for providing different detection zone options associated with each sensor type. Sensor subunits can be coupled to an interior portion of the flying vehicle 110, or can be coupled to an exterior portion of the flying vehicle 110. Sensor subunits can further be fixed in position or alternatively be adjustable in position (e.g., with actuators) based on operation modes of the flying vehicle 110.

Furthermore, in relation to operation modes described, the set of sensor subsystems can include or be coupled to switching architecture (e.g., digital switching architecture, analog switching architecture) configured to transition processing subsystems between reliance upon various subsystems, based upon reliability of data from such subsystems (e.g., as determined using weighting factors described below). In one example, the switching architecture can be structured for receiving sensor outputs of each subsystem of the set of sensor subsystems, executing a weighting operation characterizing reliability of each subsystem of the set of sensor subsystems, and transitioning between reliance upon the optical detection subsystem and the acoustic sensor subsystem (and/or other subsystems described) based upon the weighting operation.

In embodiments, the flying vehicle 110/system 100 can include or otherwise communicate with a detection subsystem 196 configured to detect a set of environmental conditions, including a first category of conditions (e.g., VFR conditions) and a second category of conditions (e.g., IFR conditions). In variations, the detection subsystem 196 can implement components that are offboard the flying vehicle 110 and optionally, components that are onboard the flying vehicle 110.

In variations, offboard components 196a can include architecture for supporting a ground weather station and/or an unmanned traffic management (UTM) service. Additionally or alternatively, the offboard components 196a can include architecture for communications with one or more ground weather stations and/or the UTM service.

In variations, onboard components 196b can include sensors onboard the flying vehicle 110 to provide information (e.g., temperature, dew point, pressure, visibility, etc.), in order to generate predictions of precipitation-associated factors. The onboard components 196b can thus include architecture for processing sensor inputs, monitoring trends in associated sensor parameters, generating calculations of current weather states, generating predictions of future weather states, and/or performing other suitable functions. In one such example, monitoring of a shrinking difference between the actual temperature and the dew point temperature can be used by the onboard components 196b to generate and return an indication of impending low visibility conditions and the possibility of visible moisture. Such an indication can be used by the system 100 to generate and execute control instructions for implementing a detect and avoid maneuver and/or activation of anti-icing or de-icing subsystems of the flying vehicle 110. Such functions can be adapted for offboard components 196a as well.

As noted above, in embodiments, the detection subsystem 196 can include architecture for supporting an optional UTM service providing obstacle advisories, path recommendations to avoid collisions, weather information, and/or other suitable functionality, In variations, the detection subsystem 196 can include a communication interface 196c, whereby data can be transmitted via the communication interface 195c (e.g., a command and control (C2)) with the flying vehicle 110. The communication interface 196c can implement or include architecture for a commands and control (C2) link to communicate between the flying vehicle 110 and the offboard components 196a and/or to communicate between the flying vehicle 110 and the UTM service. The communication interface 196c, such as a C2 link, can be based on satellite communication (e.g., public and/or private solutions, such as Iridium Communications™ satellite systems), or by way of other alternative modalities. The communication interface 196c can further provide redundancy using different methods of communication (e.g., according to different transmit and receive communication protocols/interfaces with different system types), and/or using different satellite communication providers.

As such, the communication interface 196c can include architecture for transmissions providing information relevant to operation of the flying vehicle 110. Architecture for transmissions can be implemented for detect and avoid maneuvers or other navigation purpose, for traffic avoidance in coordination with automatic dependent surveillance broadcast (ADS-B) functionality (as shown in FIG. 1C). In more detail, the flying vehicle can thus include one or more transponder components with ADS-B in functionality for receiving information pertaining to positions, movement, and characteristics of other traffic. Transponder components with ADS-B in functionality can received such information from cooperating aircraft and/or ground-based relays (e.g., implementing TIS-B, implementing FIS-B, etc.). Transponder components and additionally or alternatively include components for ADS-B out functionality, in order to provide corresponding information to other aircraft and/or remote systems. As such, transponder components and/or antennae can be positioned or mounted at the flying vehicle (e.g., at nose portion 115, at an unobstructed portion at a belly region, at an unobstructed portion at a ventral region, etc.).

Architecture for transmissions can additionally or alternatively be implemented for weather services (e.g., in relation to weather along flight path, in relation to winds aloft, in relation to wind on the ground, etc.) in order to provide further redundancy, for flight information (e.g., associated with flight restrictions, for notices, etc.), and/or for any other suitable purpose. Satellite transmission aspects of the communication interface 196c can operate in approved frequency bands (e.g., bands approved through Federal Communications Commission regulations, bands approved through Federal Aviation Administration advisory *circulars*, etc.). Associated inputs, processing, and methods associated with detect and avoid operation modes are further described below.

In embodiments, the system can implement or include architecture for an onboard processing subsystem comprising non-transitory media storing instructions thereon, that when executed by the processing subsystem performing one or more of: receiving a current flying vehicle state (e.g., position, velocity, acceleration, orientation, angular velocity, angular acceleration, airspeed or other vehicle state variables) from the one or more subsystems described above, including motion and trajectory sensors 193; fusing the data from the one or more subsystems to generate a first estimate of a surrounding state the flying vehicle 110 (e.g., based upon position, velocity, acceleration, angular velocity, angular acceleration, and other state variables); generating a second estimate of a set of relative vectors between the flying vehicle 110 and a set of obstacles and objects in an environment associated with the flying vehicle 110; and generating control instructions for transitioning the flying vehicle 110 between operation modes to avoid set of obstacles and objects. Methods are further described in Section 4 below.

2.6 System—Operation Modes Associated with Package Handling

As described above and shown in FIG. 2, embodiments of the system 100 can be configured to execute a set of operation modes including one or more of: a weight and balance detection mode 210, a package loading mode 220, a package transport mode 230 (e.g., configured for one or more of VTOL operations, fixed-wing operations, transitions between VTOL and fixed-wing operations, and other operations using the one or more thrust generation elements), a package unloading mode 240, and a flying vehicle transport or storage mode 250 (e.g., with a folded configuration). Each of the set of operation modes involves one or more structural configurations of the system, and the system 100 can transition between modes as needed, based on mission requirements. As such, the system 100 can include one or more processors 200 comprising non-transitory media storing instructions that when executed by the one or more processors perform various operation modes.

In the weight and balance detection mode 210, the weight and balance detection subsystem 160 detects weight and balance characteristics (e.g., total weight, center of gravity, etc.) of one or more packages at either or any of the storage region 120, landing support subsystem 130, and the package conveying subsystem 150. Based upon detected weight and balance characteristics, one or more processing components of the system 100 then return one or more outputs and/or execute one or more actions. In more detail, the weight and balance detection mode 210 can include a weight assessment operation mode 212 including architecture for generation of an analysis characterizing weight distribution of a set of packages from outputs of the weight and balance detection subsystem 160, and a weight distribution operation mode 213 in which the set of packages is redistributed in space, according to the analysis, at least at one of the package conveying subsystem 150 (e.g., at conveyer 154, at tray 127, etc.) and the storage region 120 of the flying vehicle 110. Redistribution can be performed automatically (e.g., with robotic apparatus configured to re-distribute individual packages in an optimized manner). However, re-distribution can alternatively be performed manually.

In variations, returned outputs associated with the analysis can be associated with one or more of: weight and balance characteristics within acceptable range, weight and balance characteristics outside of acceptable range, other analyses derived from weight and balance characteristics, reports indicating recommended loading configurations for a set of packages, computer readable instructions configured to be executed by controllers of the package conveying subsystem 150 and/or storage region 120 for loading and/or unloading of packages, computer readable instructions configured to be executed by controllers of the storage region 120 for positioning and/or repositioning of packages within the storage region 120 (e.g., as packages are loaded onto or unloaded from the storage region 120), and/or any other suitable outputs.

In variations, executed actions can include one or more of: controlling conveying elements of the package conveying subsystem 150 and/or portion (e.g., floor, level, overhead portion, etc.) of the storage region 120 for transfer of one or more packages to/from the storage region 120, repositioning of packages within the storage region 120 (e.g., as packages are loaded onto or unloaded from the storage region 120), preventing loading of packages onto the flying vehicle (e.g., if weight and balance characteristics are out of range), and/or any other suitable action.

The weight and balance detection mode 210 can be executed during pre-loading of packages, during loading of packages, during ground operations of the flying vehicle 110, during flight operations of the flying vehicle 110, during delivery operations of the flying vehicle 110, and/or at any other suitable time.

In the package loading mode 220, the nose portion 115 of the flying vehicle is transitioned to the open position, the conveyer 154 is aligned with the floor (or other suitable portion) of the storage region 120 and one or more conveying elements (e.g., rollers, belts) of the conveyer 154 is transitioned to move packages in a forward direction to the storage region 120. In relation to the package loading mode 220, components at the floor of the storage region 120 can additionally or alternatively be configured to facilitate reception of packages (e.g., with conveying elements within the storage region 120). Additionally or alternatively, package positioning apparatus of the storage region 120 can be configured to re-position packages as needed. Additionally or alternatively, retention elements within the storage region can be configured to transition (e.g., extend outward, rotate outward, etc.) to a configuration for maintaining positions and/or preventing shifting of packages.

The package loading mode 220 can be executed post pre-loading of packages and at any time when the flying vehicle 110 is intended to receive packages for storage or transport.

In the package transport mode 230, the package conveying subsystem 150 is moved away from the flying vehicle 110, the nose portion 115 of the flying vehicle is transitioned to the closed position, and the flying vehicle 110 is transitioned into modes associated with ground movement and/or flight (e.g., VTOL operations, fixed-wing operations, transitions between VTOL and fixed-wing operations, etc.), for transport of one or more packages. In relation to the package transport mode 230, components of the storage region 120 can additionally or alternatively be configured to facilitate re-positioning of packages (e.g., as packages are delivered, due to weight and balance changes of the flying vehicle, due to operation modes of the flying vehicle, etc.). In the package transport mode 230, retention elements within the storage region can be configured to maintain configurations for maintaining positions and/or preventing shifting of packages.

The package transport mode 230 can be executed subsequent to instances of the package loading mode 220 and at any time when the flying vehicle 220 is intended to transport packages to a delivery or storage site.

In the package unloading mode 240, portions of the flying vehicle 110 configured for unloading can be transitioned to open positions and/or package release modes, and one or more packages can be released from the storage region 120 of the flying vehicle 110. In variations, one or more of the nose portion 115 and other access openings (e.g., ramp doors at the belly of the flying vehicle 110, etc.) can be transitioned to open positions for allowing packages to be removed or transferred from the storage region 120. In the package unloading mode 240, retention elements within the storage region can be configured to return to retracted configurations as packages are delivered from the flying vehicle 110, and/or maintain configurations for maintaining positions and/or preventing shifting of packages that are still onboard the flying vehicle 110.

The package unloading mode 240 can be executed in association with in-air delivery of one or more packages (e.g., in flight modes, in hover modes, etc.) and/or delivery of one or more packages when the flying vehicle 110 is at a landing site and/or in contact with the ground. In relation to in-air delivery, the system 100 can be configured to drop packages (e.g., through openings on or along the belly of the flying vehicle, etc.) while keeping the flying vehicle 110 airborne.

Furthermore, in relation to the weight and balance detection mode 210, the one or more processors 200 can further include non-transitory media storing instructions that when executed by the one or more processors 200 perform a weight reassessment operation mode 214 when at least one selected package of the set of packages is delivered from the storage region 120, in coordination with the package unloading mode 240. In one such variation, in the weight reassessment operation mode 214, the set of packages can be unloaded from the storage region 120 onto the package conveying subsystem (e.g., conveyer 154, tray 127, etc.), and a selected package can be delivered to the recipient. Then, the system 100 can transition to the weight re-assessment operation mode 214 for generation of an updated analysis characterizing remaining packages of the set of packages, and remaining packages of the set of packages are re-loaded into the storage region in an optimized manner.

The system 100 can, however, be configured to transition to other states, in order to execute other modes of operation.

2.7 System—Specific Example

Figure 8A:
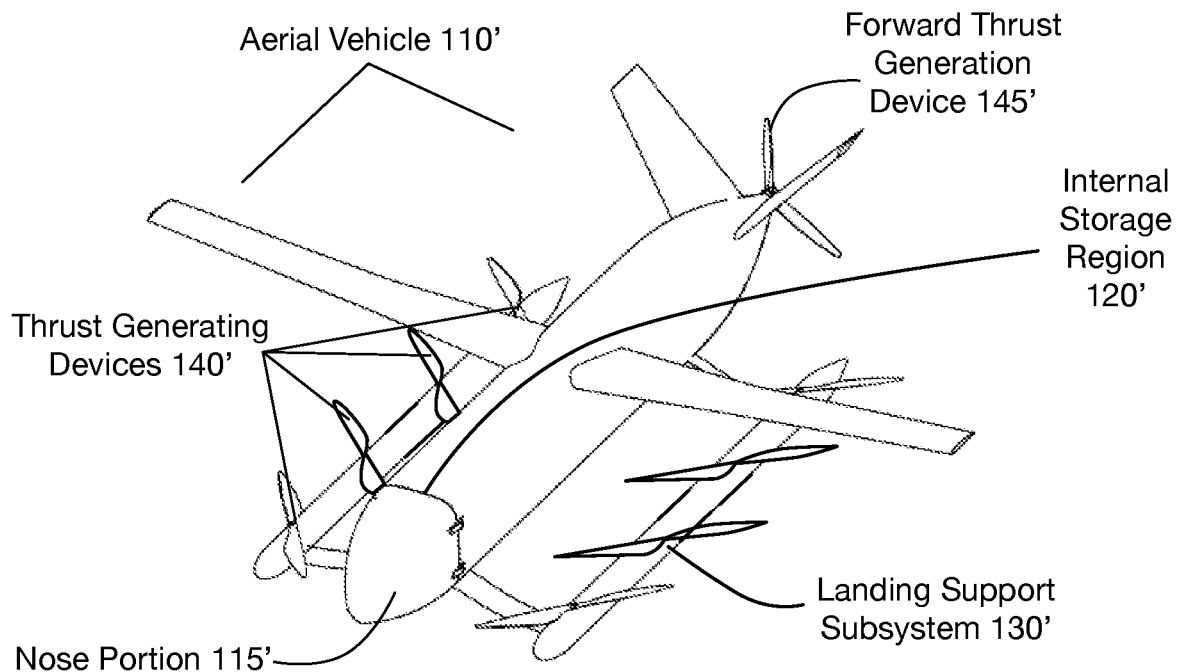
FIGS. 8A-8E depict views of a specific example of a system for package transportation.
Figure 8B:
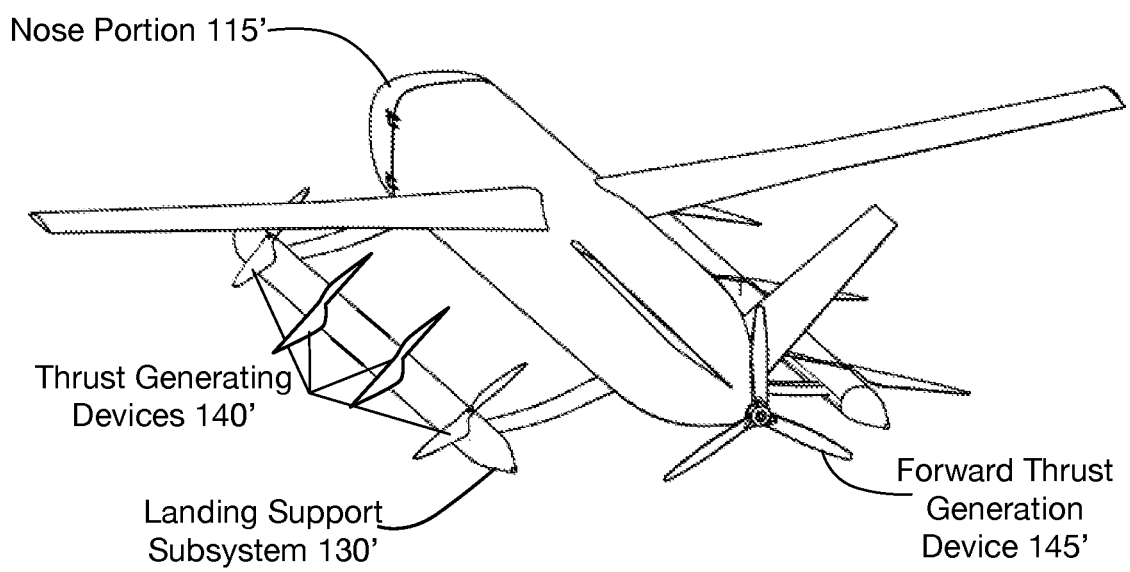
Figure 8C:
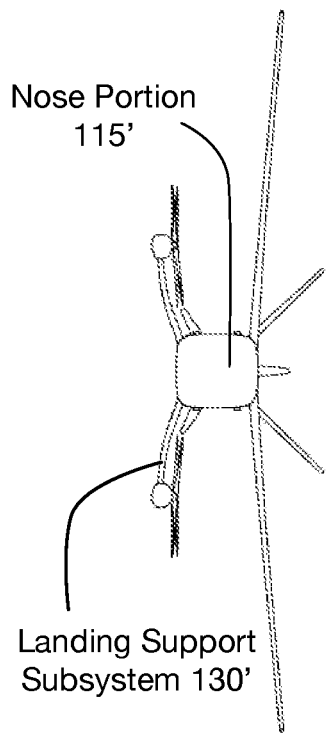
Figure 8D:
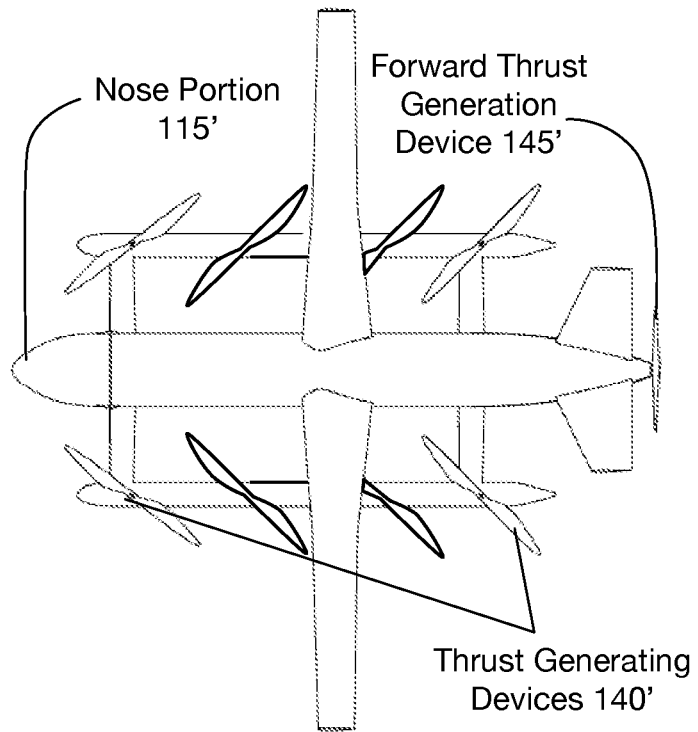
Figure 8E:
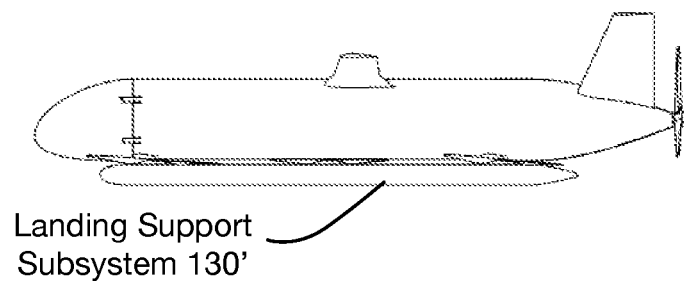

FIGS. 8A-8E depict views of a specific example of an aerial vehicle 110' for package transportation. FIG. 8A depicts an isometric view from the top front of the aerial vehicle 110'. FIG. 8B depicts an isometric view from the top back of the aerial vehicle 110'. FIG. 8C depicts a front view of the aerial vehicle 110'. FIG. 8D depicts a top view of the aerial vehicle 110'. FIG. 8E depicts a side view of the aerial vehicle 110'. As shown in FIGS. 8A-8E, the aerial vehicle 110' includes a nose portion 115' having an open mode and a closed mode; a storage region within the aerial vehicle 110' (accessible by at least nose portion 115'); a landing support subsystem 130' coupled to the aerial vehicle 110'; and a set of thrust generating devices 140' including a forward thrust generation device 145', the set of thrust generating devices 140' coupled to the aerial vehicle 110'. Variations of the specific example can additionally or alternatively include other embodiments, variations, and examples of system elements described above.

3. Methods Associated with Package Handling

Figure 9:
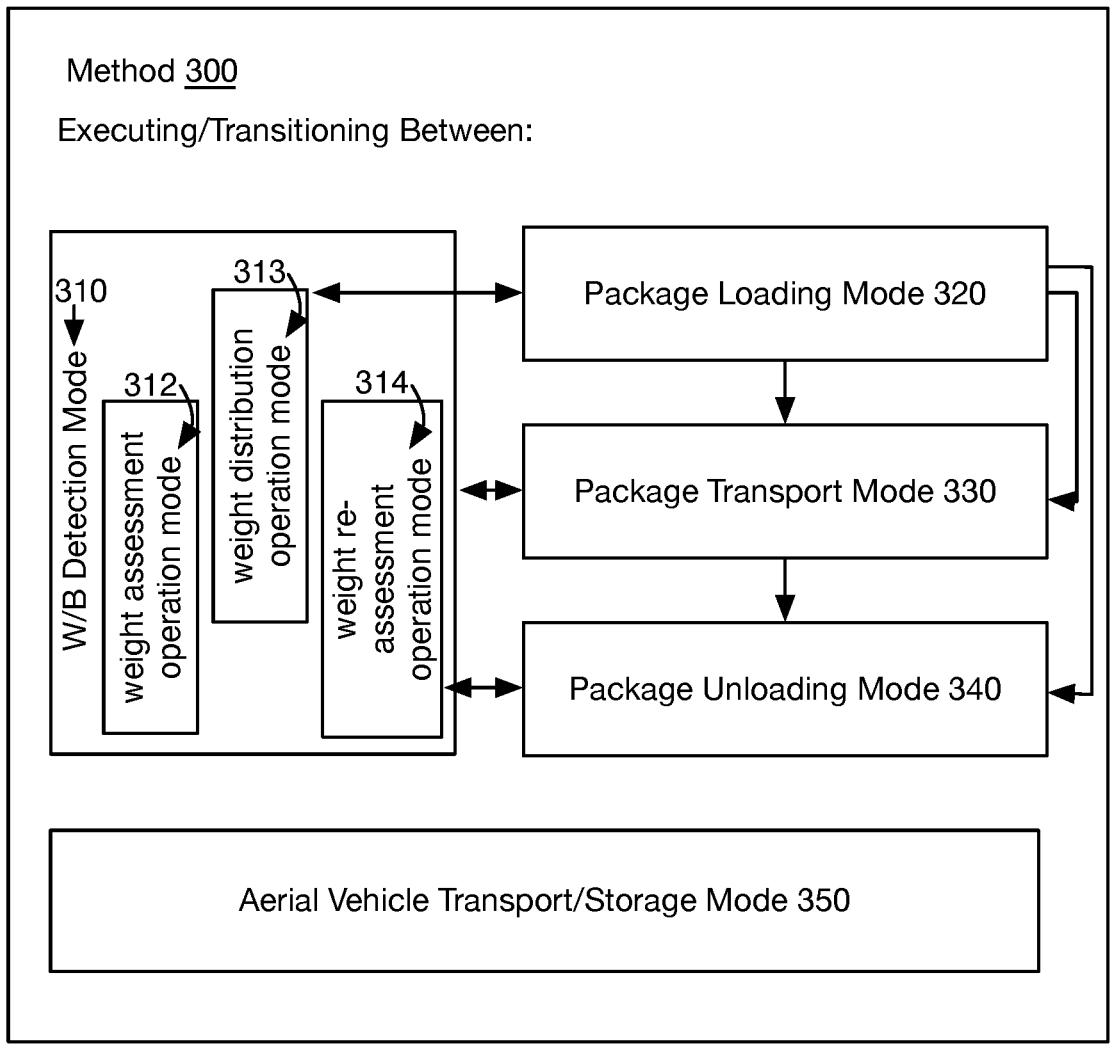
FIG. 9 depicts an embodiment of a method for package transportation.

As shown in FIG. 9, an embodiment of a method 300 for package delivery includes executing one or more of, or transitioning a flying vehicle system between one or more of: a weight and balance detection mode 310, a package loading mode 320, a package transport mode 330 (e.g., configured for one or more of VTOL operations, fixed-wing operations, transitions between VTOL and fixed-wing operations, and other operations), a package unloading mode 340, a flying vehicle transport or storage mode 350 (e.g., with a folded configuration).

The method 300 functions to receive, handle, and facilitate delivery of packages, with aspects configured for loading, storing, and unloading of multiple packages in a manner that accounts for weight and balance considerations. In relation to package delivery, the method 300 functions to provide an aerodynamically efficient solution to package transport, by employing novel aerodynamic surfaces. The method 300 also functions to provide features intended to improve safety of entities with which the flying vehicle interacts, for instance, by separating moving flying vehicle parts from human and/or non-human entities during delivery, flight, and ground operations.

As shown in FIG. 9, the weight and balance detection mode 310 includes detecting weight and balance characteristics (e.g., total weight, center of gravity, etc.) of one or more packages at either or any of the storage region, landing support subsystem, and the package conveying subsystem. Based upon detected weight and balance characteristics, the weight and balance detection mode includes returning one or more outputs and/or executing one or more actions. Returning outputs can include performing a weight assessment operation mode 312 including generating an analysis characterizing weight distribution of a set of packages from outputs of the weight and balance detection subsystem, and a weight distribution operation mode 313 including redistributing the set of packages in space, according to the analysis, at least at one of the package conveying subsystem (e.g., at conveyer, at tray, etc.) and the storage region of the flying vehicle 110. Redistribution can be performed automatically (e.g., with robotic apparatus configured to re-distribute individual packages in an optimized manner). However, re-distribution can alternatively be performed manually.

In variations, returned outputs associated with the analysis can be associated with one or more of: weight and balance characteristics within acceptable range, weight and balance characteristics outside of acceptable range, other analyses derived from weight and balance characteristics, reports indicating recommended loading configurations for a set of packages, computer readable instructions configured to be executed by controllers of the package conveying subsystem and/or storage region for loading and/or unloading of packages, computer readable instructions configured to be executed by controllers of the storage region for positioning and/or repositioning of packages within the storage region (e.g., as packages are loaded onto or unloaded from the storage region), and/or any other suitable outputs.

In variations, executed actions can include one or more of: controlling conveying elements of the package conveying subsystem and/or portion (e.g., floor, level, overhead portion, etc.) of the storage region for transfer of one or more packages to/from the storage region, repositioning of packages within the storage region 120 (e.g., as packages are loaded onto or unloaded from the storage region), preventing loading of packages onto the flying vehicle (e.g., if weight and balance characteristics are out of range), and/or any other suitable action.

The method 300 can include executing the weight and balance detection mode 310 can during pre-loading of packages, during loading of packages, during ground operations of the flying vehicle, during flight operations of the flying vehicle, during delivery operations of the flying vehicle, and/or at any other suitable time.

In executing the package loading mode 320, the method 300 can include transitioning the nose portion of the flying vehicle to the open position, and aligning the conveyer with the floor (or other suitable portion) of the storage region. Then, one or more conveying elements (e.g., rollers, belts) of the conveyer can be transitioned to move packages in a forward direction to the storage region. In relation to the package loading mode 320, components at the floor of the storage region can additionally or alternatively be configured to facilitate reception of packages (e.g., with conveying elements within the storage region). Additionally or alternatively, package positioning apparatus of the storage region can be configured to re-position packages as needed. Additionally or alternatively, retention elements within the storage region can be configured to transition (e.g., extend outward, rotate outward, etc.) to a configuration for maintaining positions and/or preventing shifting of packages.

Executing the package loading mode 320 can be performed post pre-loading of packages and at any time when the flying vehicle is intended to receive packages for storage or transport.

In executing the package transport mode 330, the method 300 can include moving the package conveying subsystem away from the flying vehicle, and transitioning the nose portion of the flying vehicle to the closed position. The flying vehicle can be transitioned into modes associated with ground movement and/or flight (e.g., VTOL operations, fixed-wing operations, transitions between VTOL and fixed-wing operations, etc.), for transport of one or more packages. In relation to the package transport mode 330, components of the storage region can additionally or alternatively be configured to facilitate re-positioning of packages (e.g., as packages are delivered, due to weight and balance changes of the flying vehicle, due to operation modes of the flying vehicle, etc.). In the package transport mode, retention elements within the storage region can be configured to maintain configurations for maintaining positions and/or preventing shifting of packages.

The package transport mode 330 can be executed subsequent to instances of the package loading mode 320 and at any time when the flying vehicle 320 is intended to transport packages to a delivery or storage site.

In executing the package unloading mode 340, the method 300 can include transitioning portions of the flying vehicle configured for unloading to open positions and/or package release modes, and one or more packages can be released from the storage region of the flying vehicle. In variations, one or more of the nose portion and other access openings (e.g., ramp doors at the belly of the flying vehicle, etc.) can be transitioned to open positions for allowing packages to be removed or transferred from the storage region. In the package unloading mode 340, retention elements within the storage region can be configured to return to retracted configurations as packages are delivered from the flying vehicle, and/or maintain configurations for maintaining positions and/or preventing shifting of packages that are still onboard the flying vehicle.

The package unloading mode 340 of the method can be executed in association with in-air delivery of one or more packages (e.g., in flight modes, in hover modes, etc.) and/or delivery of one or more packages when the flying vehicle 110 is at a landing site and/or in contact with the ground. In relation to in-air delivery, the system 100 can be configured to drop packages (e.g., through openings on or along the belly of the flying vehicle, etc.) while keeping the flying vehicle airborne.

Furthermore, in relation to the weight and balance detection mode 310, the method 300 can further include performing a weight reassessment operation mode 314 when at least one selected package of the set of packages is delivered from the storage region, in coordination with the package unloading mode 340. In one such variation, in the weight reassessment operation mode 314, the set of packages can be unloaded from the storage region onto the package conveying subsystem (e.g., conveyer, tray, etc.), and a selected package can be delivered to the recipient. Then, the method 300 can include transitioning to the weight re-assessment operation mode 314 for generation of an updated analysis characterizing remaining packages of the set of packages, and remaining packages of the set of packages are re-loaded into the storage region in an optimized manner.

The method 300 can, however, include steps for transitioning to other states, in order to execute other modes of operation.

Embodiments, variations, and examples of one or more components of the system 100 described above can implement one or more embodiments, variations, and examples of the method 300. However, the method 300 can additionally or alternatively be implemented by other suitable systems.

4. Methods Associated with Detect and Avoid Capabilities

In some embodiments, the system(s) described above can be adapted to include components and functionality for performing detect and avoid system (DAAS) operations, in relation to various sensor subsystems and controller(s) described above, where controllers can execute instructions for adjusting thrust generation device operation, control surface operation, and/or other aspects of flying vehicle operation in cooperation with processed sensor outputs and/or information from communication links described above).

As such, in some embodiments, the system(s) described above can be adapted to include components and functionality for performing detect and avoid system (DAAS) operations. DAAS operations associated with methods described can be applied to, implement and/or be executed by one or more aerial vehicle types including, but not limited to: embodiments, variations, and examples of the flying vehicle 110 described above, other aerial vehicles, such as rotorcraft, airplanes (e.g., quadplanes, taildraggers, tailsitters, etc.), gliders, balloons and other types of aircraft, where the aircraft embodiments include: a body; one or more thrust generation devices and/or lifting systems coupled to the body; a controller; a processor; one or more sensing subsystems described above, a DAAS system implementing and/or processing outputs of one or more subsystem components described above, for generation of control instructions to execute transitions between various operation modes (e.g., thrust generation operation modes, control surface operation modes, switching between primary reliance upon various sensing subsystems, handling of communications/data transmission, executing package handling operation modes, etc.); and other suitable aspects. For instance, one or more of the set of subsystems can be structured for weather detection, and the controller/processor can include architecture for generating an assessment indicating that the flying vehicle is operating in visual flight rules (VFR) conditions or instrument flight rules (IFR) conditions from the set of subsystems, and adjusting weights applied to outputs of sensors of the set of subsystems based upon the assessment in order to guide various detect and avoid operations described in more detail below.

Figure 10:
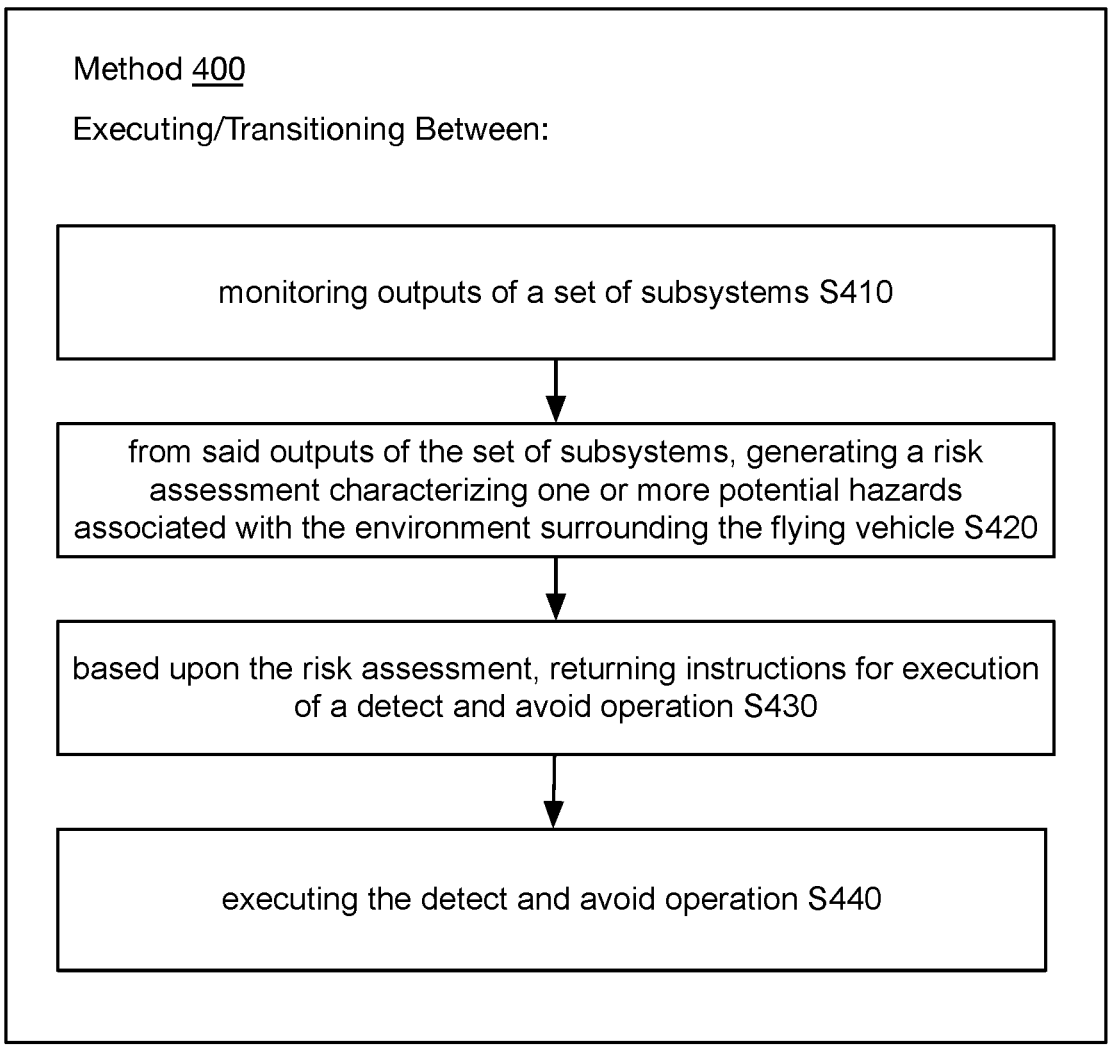
FIG. 10 depicts an embodiment of a method for detect and avoid operations.

As such, as shown in FIGS. 10 and 1C, an embodiment of a method 400 for executing detect and avoid operations for a flying vehicle can include: monitoring outputs of a set of subsystems associated with a flying vehicle, wherein the flying vehicle comprises a set of fixed-wing operation modes and a set of vertical take-off and landing (VTOL) operation modes, and wherein the set of subsystems generate signals associated with an operational environment surrounding the flying vehicle S410; from said outputs of the set of subsystems, generating a risk assessment characterizing one or more potential hazards associated with the environment surrounding the flying vehicle S420; based upon the risk assessment, returning instructions for execution of a detect and avoid operation S430; and executing the detect and avoid operation S440. The method 400 functions to process information from on-board sensors, off-board stations, and/or other services, in order to inform decision-making and associated maneuvers for the flying vehicle, such that the flying vehicle can appropriately respond to environmental factors (e.g., weather-associated phenomena), obstacles, traffic, and/or other objects potentially intersecting with a path of movement (actual or intended) of the flying vehicle.

The method 400 can implement system components described above and/or other suitable system elements, such as system elements described in U.S. application Ser. No. 17/218,032 filed on 30 Mar. 2021, which is herein incorporated in its entirety by this reference.

4.1 Detect and Avoid—Monitoring Sensor Outputs

Block S410 recites: monitoring outputs of a set of subsystems associated with a flying vehicle, which functions to enable detection of situations that the flying vehicle should respond to. In embodiments, monitoring outputs can include monitoring outputs of vision-based sensors, acoustic sensors, thermal sensors, motion sensors, other weather sensors, and/or other sensors described above. Additionally or alternatively, monitoring outputs in Block S410 can include monitoring outputs of ground-based stations (e.g., through a communication link), satellite-based outputs, outputs of other services described (e.g., UTM services), and/or other outputs. As described above, outputs can be indicative of aspects of traffic, weather, obstacles, objects, and/or other elements in the environment of the flying vehicle.

Monitoring of outputs can be performed through wired and/or wireless connections between the flying vehicle and various subsystems/services.

Monitoring of outputs can further be performed at a desired frequency and/or in response to a request or demand input from an operator associated with the flying vehicle. Additionally or alternatively, monitoring can be triggered by other objects that detect the flying vehicle and/or are aware of a path of motion of the flying vehicle, such that monitoring can be triggered if another system first detects the flying vehicle and broadcasts a signal or otherwise communicates with the detect and avoid system associated with the flying vehicle.

Monitoring can, however, be implemented in another suitable manner.

4.2 Detect and Avoid—Risk Assessment

Block S420 recites: from said outputs of the set of subsystems, generating a risk assessment characterizing one or more potential hazards associated with the environment surrounding the flying vehicle, in relation to a path of movement of a flying vehicle, in relation to a corridor or other portion of airspace designed for flying vehicles (e.g., unmanned aerial vehicles (UAVs), non-UAVs, etc.), and/or other suitable aspects of operation of the flying vehicle.

Block S420 can implement model architecture for processing sensor outputs and characterizing/classifying traffic, objects, weather, obstacles, and/or other environmental elements. In variations, classifying traffic can include classifying traffic based on size, type (e.g., as described above), and/or other features, such as production of wake turbulence or other disturbances that could affect the flying vehicle 110. In variations, classifying objects can include categorizing an object as stationary or moving, classifying size, classifying an object as living or non-living, and/or performing other suitable classification operations. In variations, classifying weather can include classifying type of weather and/or aspects of weather severity. In variations, classifying obstacles can include classification of terrain features and/or other structures (e.g., built structures), along with associated altitudes and morphological features.

Block S420 can further include characterization of distance features (e.g., relative distance), velocity features (e.g., relative velocity), and/or acceleration features (e.g., relative acceleration) between the flying vehicle and elements of the risk assessment, at current, historical, and/or future time points. As such, Block S420 can return, with the risk assessment, historical trends and/or anticipated trends in relative positioning between the flying vehicle and the element(s) of the risk assessment, in order to inform downstream decision making and execution of operations and maneuvers by the flying vehicle.

In embodiments, the element state, or relative vector estimation can be based on robust weighted average, where the weight for each sensor/sensor subsystem output can be based upon one or more of the following: robustness of the data from the sensor subsystem (which can be based on metrics such as the variance and the covariance matrix). As such, the data from each sensor subsystem will only be considered once the metric passes a detection threshold, and the threshold can be set with hysteresis. Furthermore, data persistence and learning through time (i.e., once a sensor detects an obstacle, the autopilot will start integrating the time after a minimum threshold time; longer detection times will be mapped to higher weights) can improve accuracy of returned outputs. Additionally or alternatively, weather factors can affect weighting of various sensor outputs (e.g., in VFR conditions, the vision and radar system will be highly weighted; in IFR conditions, the acoustic system will be highly weighted; etc.). Additionally or alternatively, other weighting factors can be implemented.

In embodiments, an extended Kalman filter (EKF) or sensor fusion algorithms implemented by processors can fuse the data from detect and avoid sensors and services, as well as from flying vehicle states to obtain an estimate of relative vectors (e.g., associated with motion and positions). As such, the processor(s) can include architecture for determining if the flying vehicle is on a collision course, based on the state of the flying vehicle and the state of the obstacles. In embodiments, obstacle state data can be obtained from the detect and avoid inputs from one or more of: the detect and avoid sensory system, the UTM service; control ground station input; ADSB in or remote identifiers; and other suitable sources.

In embodiments, the system can implement or include architecture for an offboard processing unit that performs one or more of the following: generating efficient paths between the flying vehicle current position and destination that are free from collisions, generating paths that avoid restricted airspace or other airspace based on other requirements (e.g., associated with capabilities of the flying vehicle), and generating paths that avoid weather conditions that are outside the capabilities of the flying vehicle. In terms of collisions, the path can be checked against both the static obstacles and the dynamic obstacles (e.g., communicated via a C2 link). The processing subsystem(s) can further communicate with a UTM service for path advisory, test candidate paths under various weather conditions or other conditions to confirm that it is free from collisions and avoids airspace or environmental conditions that are outside the capabilities of the aircraft, and perform other suitable functions.

Additionally or alternatively, Block S420 can include characterization of aspects of elements that could affect operation of subsystems described, and warrant transitioning to reliance upon other subsystems. In examples, aspects of elements can include surface features (e.g., reflectiveness, absorption, etc.) that could affect vision-based sensor operation, and be used to guide transitions to reliance upon other sensor types (e.g., acoustic sensors). In another example, aspects of elements can include elements that affect vision and acoustic-based sensors, and be used to guide transitions to reliance upon thermal sensors. Additionally or alternatively, aspects of elements can include other features that guide preferential reliance upon various subsystems described.

Model architecture can be trained in one or more phases using training and test sets of data derived from all or a subset of sensors described above. Such training and test data can be processed and transformed to generate direct and/or combinatorial features, that can be implemented in layers of model architecture to refine returned outputs.

In relation to model architecture and training, statistical analyses and/or machine learning algorithm(s) can be characterized by a learning style including any one or more of: supervised learning (e.g., using back propagation neural networks), unsupervised learning (e.g., K-means clustering), semi-supervised learning, reinforcement learning (e.g., using a Q-learning algorithm, using temporal difference learning, etc.), and any other suitable learning style. Furthermore, any algorithm(s) can implement any one or more of: a regression algorithm, an instance-based method (e.g., k-nearest neighbor, learning vector quantization, self-organizing map, etc.), a regularization method, a decision tree learning method (e.g., classification and regression tree, chi-squared approach, random forest approach, multivariate adaptive approach, gradient boosting machine approach, etc.), a Bayesian method (e.g., naïve Bayes, Bayesian belief network, etc.), a kernel method (e.g., a support vector machine, a linear discriminate analysis, etc.), a clustering method (e.g., k-means clustering), an associated rule learning algorithm (e.g., an Apriori algorithm), an artificial neural network model (e.g., a back-propagation method, a Hopfield network method, a learning vector quantization method, etc.), a deep learning algorithm (e.g., a Boltzmann machine, a convolution network method, a stacked auto-encoder method, etc.), a dimensionality reduction method (e.g., principal component analysis, partial least squares regression, etc.), an ensemble method (e.g., boosting, boot strapped aggregation, gradient boosting machine approach, etc.), and any suitable form of algorithm.

4.3 Detect and Avoid—Operations and Maneuvers

Block S430 recites: based upon the risk assessment, returning instructions for execution of a detect and avoid operation. Block S430 functions to initiate transitioning of the flying vehicle between various modes, such that the flying vehicle can appropriately respond to various risks associated with an actual or intended path of motion of the flying vehicle. Instructions can be returned by a ground station and communicated to the flying vehicle through a communication link. Additionally or alternatively, instructions can be returned by systems on-board the flying vehicle. Block S440 recites: executing the detect and avoid operation, where execution can include adjusting aspects of thrust generation devices (e.g., transitions between power settings for forward thrust generating devices and/or vertical thrust generating devices for fixed wing and VTOL flight modes, increasing speed, decreasing speed, executing a turn, executing a climbing operation, executing a descending operation, etc.), flight control surfaces, landing support systems, and/or other adjustable flying vehicle aspects (e.g., through actuators, through power output, through electrical signals, etc.) based upon the generated instructions.

Figure 1D:
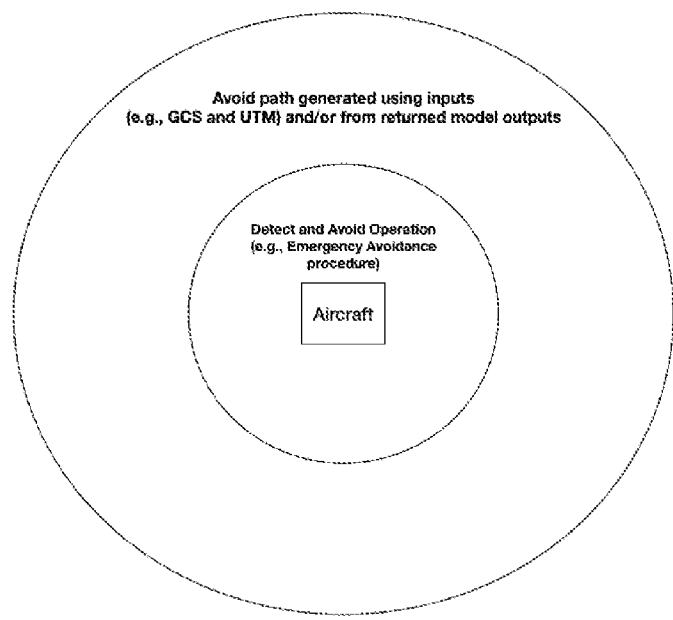
FIG. 1D depicts an exemplary avoid path generated using various parameters, and detect and avoid operations associated with emergency situations.

In variations, the detect and avoid operation can include one or more of: an adjusted path of movement; a change in heading operation; a return to path operation; a circle/hold operation; a landing operation (e.g., with sequencing and/or avoidance of other traffic in a traffic pattern, a column of airspace, and a hub of traffic operations; in relation to ground weather phenomena, such as fog or ice; landing at an alternative site, etc.); a return to home operation; a transition between a fixed-wing operation mode and a VTOL/eVTOL operation mode (e.g., with respect to approaching hubs or hot spots, transitioning from a fixed wing to a VTOL operation mode); a takeoff operation (e.g., after verification that takeoff is safe); an aircraft collision avoidance system (ACAS) operation mode (e.g., in high traffic situations, in other traffic situations); a hold operation; emergency operations; and/or other suitable operation modes. In particular, the flying vehicle is capable of a set of fixed-wing operation modes and a set of vertical take-off and landing (VTOL) operation modes, and a detect and avoid operation can include a transition between one of the set of VTOL operation modes and one of the set of fixed-wing operation modes. Additionally or alternatively, a detect and avoid operation can include a transition between one of the set of VTOL operation modes and another one of the set of VTOL operation modes. Additionally or alternatively, detect and avoid operation can include a transition between one of the set of fixed-wing operation modes and another one of the set of fixed-wing operation modes In one example, if outputs of Block S420 indicate that the flying vehicle is on collision path: If the obstacle is within the most inner collision airspace of the flying vehicle, the flying vehicle can be instructed to take emergency avoidance procedures (e.g., a change in altitude or heading), and return to path after the obstacle is clear, minimizing the path deviation time; however, if the obstacle is not within the most inner collision airspace of the flying vehicle, the autopilot will send the collision state (e.g., via the C2 link to the ground station or UTM service), and will receive back a new path (e.g., from the ground station or UTM service) that is collision-free. This option guarantees keeping the necessary clearances for all requirements while providing an optimal route to the destination. In variations, outputs of the processing subsystem can be used to guide other aircraft operations or states to avoid obstacles and objects in another suitable manner. Furthermore, as shown in FIG. 1D, detect and avoid operations can be associated with a first region of operation (e.g., outer ring in FIG. 1D) associated with avoid pathways for the first region further away from the flying vehicle, and a second region of operation (e.g., inner ring in FIG. 1D) associated with emergency avoidance procedures for the second region closer to the flying vehicle.

As such, in embodiments, the system can implement or include architecture for an onboard processing subsystem comprising non-transitory media storing instructions thereon, that when executed by the processing subsystem performing one or more of: receiving a current vehicle state (e.g., position, velocity, acceleration, orientation, angular velocity, angular acceleration, airspeed or other vehicle state variables) from the flight controller; fusing the data from the various detect and avoid sources to estimate the state of obstacles and/or other objects (e.g., based upon position, velocity, acceleration, angular velocity, angular acceleration, and other state variables); estimating relative vectors between the vehicle and obstacle(s)/object(s); and generating control instructions for transitioning the aircraft between operation modes to avoid such obstacles/objects.

Additionally or alternatively, in relation to package handling operations, the detect and avoid operation can include one or more of: Shifting of weight/weight distribution of packages in relation to maneuvers and operations described (e.g., with respect to transitions between fixed wing and VTOL or other flight modes, etc.).

Generation and execution of operations and maneuvers can, however, implement other components or capabilities.

5. Conclusions

The FIGURES illustrate the architecture, functionality and operation of possible implementations of systems, methods and computer program products according to preferred embodiments, example configurations, and variations thereof. In this regard, each block in the flowchart or block diagrams may represent a module, segment, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. Embodiments may also relate to an apparatus for performing the operations herein. This apparatus may be specially constructed for the required purposes, and/or it can include a computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability. Embodiments can also relate to a product that is produced by a computing process described herein. Such a product may comprise information resulting from a computing process, where the information is stored on a non-transitory, tangible computer readable storage medium and may include any embodiment of a computer program product or other data combination described herein.

As a person skilled in the art will recognize from the previous detailed description and from the figures and claims, modifications and changes can be made to the preferred embodiments of the invention without departing from the scope of this invention defined in the following claims.

What is claimed is:

1. A system comprising:
    A flying vehicle comprising a nose portion, a set of bilateral wings, a ventral frame, and a tail region;
    a storage region comprising a volumetric capacity and a weight capacity for receiving a set of packages at the flying vehicle;
    a set of thrust generating devices positioned inferior and posterior to access locations of the storage region, the set of thrust generating devices comprising a first subset supporting a vertical takeoff and landing (VTOL) operation mode distributed across the ventral frame and a second subset comprising a forward thrust generation device positioned at the tail region;
    a set of subsystems in communication with an operational environment of the flying vehicle; and
    one or more processors comprising non-transitory media storing instructions that when executed by the one or more processors perform:
        a monitoring mode comprising monitoring outputs of the set of subsystems;
        a detection mode comprising: from said outputs of the set of subsystems, generating a risk assessment characterizing one or more potential hazards associated with the operational environment of the flying vehicle; and
        an avoid mode comprising: based upon the risk assessment, returning instructions for execution of a detect and avoid operation, wherein the detect and avoid operation further comprises shifting of a weight distribution of the set of packages at the storage region in coordination with execution of a maneuver.

2. The system of claim 1, wherein the set of subsystems comprises a transponder subsystem comprising architecture for receiving ADS-B in information and transmitting ADS-B out information.

3. The system of claim 1, wherein the set of subsystems comprises an optical detection subsystem comprising one or more optical sensors mounted to the flying vehicle and structured for detection of air traffic, objects, obstacles, and weather phenomena of the operational environment.

4. The system of claim 3, wherein the set of subsystems comprises an acoustic sensor subsystem comprising one or more acoustic sensors mounted to the flying vehicle and structured for detection of sound and vibration features from air traffic, objects, obstacles, and weather phenomena of the operational environment.

5. The system of claim 4, further comprising switching architecture structured for receiving sensor outputs of each subsystem of the set of subsystems, executing a weighting operation characterizing reliability of each subsystem of the set of subsystems, and transitioning between reliance upon the optical detection subsystem and the acoustic sensor subsystem based upon the weighting operation.

6. The system of claim 4, wherein one or more of the set of subsystems is structured for weather detection, the system further comprising architecture for generating an assessment indicating that the flying vehicle is operating in visual flight rules (VFR) conditions or instrument flight rules (IFR)

conditions from the set of subsystems, and adjusting weights applied to outputs of sensors of the set of subsystems based upon the assessment.

7. The system of claim 1, wherein the set of subsystems further comprises a thermal sensor subsystem mounted to the flying vehicle and comprising structures for detection of heat signatures from objects in the operational environment.

8. The system of claim 1, wherein the flying vehicle further comprises a set of communication links to a remote weather station and an unmanned traffic management (UTM) service.

9. The system of claim 1, wherein the set of subsystems further comprises an on-board radar subsystem.

10. The system of claim 1, wherein generating the risk assessment comprises characterizing relative distance, relative velocity, and relative acceleration between the flying vehicle and one or more objects and weather phenomena in the operational environment.

11. The system of claim 1, wherein the flying vehicle is capable of a set of fixed-wing operation modes and a set of vertical take-off and landing (VTOL) operation modes, and wherein the detect and avoid operation comprises a transition between one of the set of VTOL operation modes and one of the set of fixed-wing operation modes.

12. The system of claim 11, wherein the detect and avoid operation further comprises a transition between one of the set of VTOL operation modes and another one of the set of VTOL operation modes.

13. The system of claim 11, wherein the detect and avoid operation further comprises a transition between one of the set of fixed-wing operation modes and another one of the set of fixed-wing operation modes.

14. The system of claim 1, wherein the detect and avoid operation comprises at least one of: a vertical takeoff operation, a modified path through airspace, and a vertical landing operation.

15. The system of claim 1, wherein the one or more processors further comprise non-transitory media storing instructions that when executed by the one or more processors perform execution of said instructions for the detect and avoid operation, wherein execution comprises adjusting operation of at least one of: the set of thrust generation devices, flight control surfaces of the flying vehicle, and landing support systems of the flying vehicle.

16. A method comprising:
monitoring outputs of a set of subsystems associated with a flying vehicle, wherein the flying vehicle comprises a set of fixed-wing operation modes and a set of vertical take-off and landing (VTOL) operation modes, and wherein the set of subsystems generate signals associated with an operational environment surrounding the flying vehicle;
from said outputs of the set of subsystems, generating a risk assessment characterizing one or more potential hazards associated with the environment surrounding the flying vehicle; based upon the risk assessment, returning instructions for execution of a detect and avoid operation; and
executing the detect and avoid operation, wherein the detect and avoid operation comprises shifting of a weight distribution of a set of packages at a storage region of the flying vehicle, in coordination with execution of a maneuver, wherein the storage region comprises a volumetric capacity and a weight capacity for receiving the set of packages.

17. The method of claim 16, wherein the set of subsystems comprises:
an optical detection subsystem comprising one or more optical sensors mounted to the flying vehicle,
an acoustic sensor subsystem comprising one or more acoustic sensors mounted to the flying vehicle, and
switching architecture structured for receiving sensor outputs of the optical detection subsystem and the acoustic sensor subsystem, executing a weighting operation characterizing reliability of optical detection subsystem and the acoustic sensor subsystem, and transitioning between reliance upon the optical detection subsystem and the acoustic sensor subsystem based upon the weighting operation.

18. The method of claim 16, wherein the set of subsystems comprises a set of communication links to a remote weather station and an unmanned traffic management (UTM) service.

19. The method of claim 16, wherein generating the risk assessment comprises implementing a fusion operation from outputs of the set of subsystems, and wherein the detect and avoid operation comprises a modified path for the flying vehicle.

20. The method of claim 16, wherein the detect and avoid operation comprises a transition between one of the set of VTOL operation modes and one of the set of fixed-wing operation modes.

21. The method of claim 16, wherein the detect and avoid operation comprises at least one of a takeoff operation and a landing operation.

* * * * *